(12) United States Patent
Suzuki et al.

(10) Patent No.: US 9,393,551 B2
(45) Date of Patent: Jul. 19, 2016

(54) CATALYST FOR REFORMING TAR-CONTAINING GAS, METHOD FOR PREPARING CATALYST FOR REFORMING TAR-CONTAINING GAS, METHOD FOR REFORMING TAR-CONTAINING GAS USING CATALYST FOR REFORMING TAR CONTAINING GAS, AND METHOD FOR REGENERATING CATALYST FOR REFORMING TAR-CONTAINING GAS

(75) Inventors: Kimihito Suzuki, Tokyo (JP); Kenichiro Fujimoto, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 822 days.

(21) Appl. No.: 13/320,524

(22) PCT Filed: May 18, 2010

(86) PCT No.: PCT/JP2010/003347
§ 371 (c)(1),
(2), (4) Date: Nov. 14, 2011

(87) PCT Pub. No.: WO2010/134326
PCT Pub. Date: Nov. 25, 2010

(65) Prior Publication Data
US 2012/0058030 A1 Mar. 8, 2012

(30) Foreign Application Priority Data

May 19, 2009 (JP) .............................. P2009-121045
Mar. 31, 2010 (JP) .............................. P2010-083934

(51) Int. Cl.
*B01D 53/86* (2006.01)
*B01J 37/10* (2006.01)
(Continued)

(52) U.S. Cl.
CPC ................ *B01J 23/83* (2013.01); *B01J 23/002* (2013.01); *B01J 23/94* (2013.01); *B01J 37/03* (2013.01); *C01B 3/40* (2013.01); *C10J 3/005* (2013.01); *C10K 1/34* (2013.01); *C10K 3/006* (2013.01);
(Continued)

(58) Field of Classification Search
USPC .................................. 502/304, 340–341, 337
See application file for complete search history.

(56) References Cited

U.S. PATENT DOCUMENTS 5,492,878 A * 2/1996 Fujii .................... B01D 53/945
423/213.5

FOREIGN PATENT DOCUMENTS

| CN | 1232720 A | 10/1999 |
|---|---|---|
| CN | 1986049 A | 6/2007 |

(Continued)

OTHER PUBLICATIONS

Basile et al., "Catalytic Behavior of Ni- and Rh-containing Catalysts in the Partial Oxidation of Methane at Short Residence Times", Natural Gas Conversion V, Studies in Surface Science and Catalysts, vol. 119, 1998, pp. 693-698.

(Continued)

*Primary Examiner* — Melvin C Mayes
*Assistant Examiner* — Douglas Call
(74) *Attorney, Agent, or Firm* — Birch, Stewart, Kolasch & Birch, LLP

(57) ABSTRACT

Disclosed is a catalyst for reforming a tar-containing gas, wherein the catalyst contains at least one composite oxide as oxide containing nickel, magnesium, cerium and aluminum and the content of alumina as a single compound is limited to 5% by mass or less.

28 Claims, 5 Drawing Sheets

(51) Int. Cl.
  *B01J 38/12* (2006.01)
  *B01J 38/06* (2006.01)
  *B01J 21/10* (2006.01)
  *B01J 37/08* (2006.01)
  *B82Y 30/00* (2011.01)
  *B01J 23/83* (2006.01)
  *B01J 23/00* (2006.01)
  *B01J 23/94* (2006.01)
  *B01J 37/03* (2006.01)
  *C01B 3/40* (2006.01)
  *C10K 1/34* (2006.01)
  *C10K 3/00* (2006.01)
  *C10K 3/02* (2006.01)
  *C10J 3/00* (2006.01)

(52) U.S. Cl.
  CPC .............. *C10K 3/023* (2013.01); *B01J 2523/00* (2013.01); *C01B 2203/0227* (2013.01); *C01B 2203/0415* (2013.01); *C01B 2203/0465* (2013.01); *C01B 2203/0877* (2013.01); *C01B 2203/1058* (2013.01); *C01B 2203/1082* (2013.01); *C01B 2203/1094* (2013.01); *C10J 2300/093* (2013.01); *C10J 2300/0916* (2013.01); *Y02P 20/584* (2015.11)

(56) References Cited

FOREIGN PATENT DOCUMENTS

| | | |
|---|---|---|
| JP | 58-076487 A | 5/1983 |
| JP | 59-44346 B2 | 10/1984 |
| JP | 08-134456 A | 5/1996 |
| JP | 2000-000469 A | 1/2000 |
| JP | 2000-248286 A | 9/2000 |
| JP | 2003-055671 A | 2/2003 |
| JP | 2004-000900 A | 1/2004 |
| JP | 2006-061760 A | 3/2006 |
| JP | 2007-229548 A | 9/2007 |
| JP | 2007-313496 A | 12/2007 |
| JP | 2008-018414 A | 1/2008 |
| JP | 2008-132458 A | 6/2008 |
| JP | 2008-239443 A | 10/2008 |
| JP | 2008-279337 A | 11/2008 |
| WO | WO 2009/084736 A1 | 7/2009 |
| WO | WO 2010/035430 A1 | 4/2010 |

OTHER PUBLICATIONS

International Search Report for PCT/JP2010/003347 dated Aug. 3, 2010.
Nakamura et al., "Promoting effect of MgO addition to Pt/Ni/CeO2/Al2O3 in the steam gasification of biomass", Applied Catalysts B: Enviromental 86, 2009, pp. 36-44.
Song et al., "Tri-reforming of methane: a novel concept for catalytic production of industrially useful synthesis gas with desired H2/CO ratios", Catalysis Today 98, 2004, pp. 463-484.
Chinese Office Action for corresponding Chinese Application No. 201080021561.X dated Apr. 23, 2013 (with English translation).
Daza et al., "CO2 reforming of methane over Ni/Mg/Al/Ce mixed oxides", Catalysis Today, vol. 133-135, 2008, pp. 357-366, (available online Feb. 19, 2008).
Lucrédio et al., "Nickel catalyst promoted with cerium and lanthanum to reduce carbon formation in partial oxidation of methane reactions", Applied Catalysis A: General, vol. 333, 2007, pp. 90-95, (available online Sep. 14, 2007).

\* cited by examiner

CATALYST FOR REFORMING TAR-CONTAINING GAS, METHOD FOR PREPARING CATALYST FOR REFORMING TAR-CONTAINING GAS, METHOD FOR REFORMING TAR-CONTAINING GAS USING CATALYST FOR REFORMING TAR CONTAINING GAS, AND METHOD FOR REGENERATING CATALYST FOR REFORMING TAR-CONTAINING GAS

TECHNICAL FIELD

The present invention relates to a catalyst for reforming a tar-containing gas (hereinafter, referred to as a catalyst) that converts a high-temperature tar-containing gas generated when a carbonaceous material is thermally decomposed, into gases such as hydrogen, carbon monoxide or methane, a method for preparing a catalyst for reforming a tar-containing gas, a method for reforming a tar-containing gas using the catalyst for reforming a tar-containing gas, and a method for regenerating a catalyst for reforming a tar-containing gas.

Priority is claimed on Japanese Patent Application No. 2009-121045, filed on May 19, 2009, and Japanese Patent Application No. 2010-083934, filed on Mar. 31, 2010, the content of which is incorporated herein by reference.

BACKGROUND ART

The steel industry is an industry which consumes a large amount of energy, but about 40% of waste heat in a steel manufacturing process in accordance with a blast furnace method is non-used waste heat. In such waste heat, as a heat source which is easily recovered, but is not available in the related art, there is sensible heat of a high-temperature coke oven gas (crude COG) generated from a coke oven. Patent Document 1 and Patent Document 2 disclose a method for indirectly recovering sensible heat of crude COG. Specifically, Patent Document 1 or Patent Document 2 discloses that sensible heat is recovered by circulating a heat medium in a heat-transfer pipe provided inside an ascending pipe (or between the ascending pipe part and a dry main) of a coke oven. However, in this method, tar, light oil or the like accompanying crude COG is adhered to the outer surface of the heat-transfer pipe and is thus densified by carbonation and aggregation of the adhered material. As a result, deterioration in heat transfer efficiency over time or deterioration in heat exchange efficiency is inevitable. As a method for solving these problems, Patent Document 3 discloses coating of a catalyst such as crystalline aluminosilicate or crystalline silica on the outer surface of the heat-transfer pipe. According to this method, heat transfer efficiency can be stably maintained, since the adhered materials such as tar are decomposed into hydrocarbons with a low molecular weight through the coated catalyst. However, this method also enables indirect recovery of sensible heat of crude COG, but does not consider at all whether or not the decomposition product of heavy hydrocarbons such as tar becomes light hydrocarbons which are easily available as a gas fuel. In addition, this method does not consider deterioration of decomposition activity over time by a catalyst-poisoning sulfur compound such as hydrogen sulfide contained in a high concentration in crude COG.

There is almost no method which converts a reactive gas produced at a high temperature into chemical energy by incorporating a direct chemical reaction in the presence of a catalyst using the sensible heat. Almost all the cases in the related art are cases in which sensible heat in the form of a high-temperature gas is indirectly recovered (or not used at all) and the gas after cooling is treated and then used. Crude COG has sensible heat, but contains a sulfur compound in an amount higher than 2,000 ppm. Accordingly, it is thought to be substantially impossible to realize the method mentioned above from a viewpoint of designing the catalyst reaction by a decomposition reaction of heavy hydrocarbons such as tar. As described in Patent Document 4, $Ni_xMg_{1-x}O-SiO_2$ spray drying solid solution catalyst, $Ni/Al_2O_3$ catalyst, active $Al_2O_3$ catalyst, $Fe/Al_2O_3$ catalyst and the like were reviewed, but the reforming activity of these catalysts was insufficient. In addition, an energy conversion catalyst is vulnerable to sulfur poisoning or carbon deposition. For this reason, it was difficult to prepare catalysts suitable for a decomposition reaction of tar composed of a condensed polycyclic aromatic material which may readily cause carbon deposition under an atmosphere containing a high concentration of sulfur compound, as mentioned above. In addition, when the reaction is performed and performance of the catalyst is then degraded, in a case where the catalyst is regenerated by air combustion, supported metal particles may be readily sintered (coarsened). For this reason, it is difficult to realize the reproduction of catalytic activity by regeneration.

In addition, besides the support method mentioned above, Patent Document 4 discloses a method for preparing catalysts for reforming hydrocarbons by mixing silica or alumina as a binder with a nickel magnesia compound, followed by spray drying, and a method for preparing catalysts for reforming hydrocarbons by physically adding a silica powder or an alumina powder to a nickel magnesia-based compound, followed by mixing. However, high catalytic activity or final product strength cannot be obtained with the method in which a silica powder or alumina powder is physically added to the nickel magnesia compound powder, followed by mixing, molding and baking.

Patent Document 5 discloses a method for obtaining purified COG used as fuels such as town gas or chemically synthetic materials by removing impurities (such as $H_2S$, COS, aromatic hydrocarbon, tar and dust) contained in crude COG. In a case where a methanol synthetic plant is designed using COQ, there is a concern that the catalyst in the reforming apparatus thereof may be poisoned, since lower hydrocarbons or aromatic hydrocarbons remain in the purified COG obtained by the method. Accordingly, for example, Patent Document 6 discloses a preparation system in which pre-reforming is performed using a commercially available catalyst, and a synthetic gas is prepared using a reforming device. However, the document does not disclose a catalyst used for the reforming apparatus for preparing the synthetic gas in the latter part. That is, to date, there has been no research associated with the catalyst for reforming purified COG or crude COG containing a high concentration of tar.

Meanwhile, a great deal of research has been carried out for a long time on a catalyst for reforming methane, which is generally used as a material in reforming hydrocarbons.

For example, Non-Patent Document 1 suggests a catalyst prepared using a precipitate from a solution containing nickel, magnesium and aluminum, as a partial oxidation catalyst of methane.

Patent Document 7 discloses a catalyst in which oxide composed of nickel, magnesium and calcium is mixed with at least one of Group 3B elements, Group 4A elements, Group 6B elements, Group 7B elements, Group 1A elements and lanthanide elements.

Patent Document 8 discloses a catalyst which contains magnesium, aluminum and nickel as constituent elements and contains one or more elements selected from alkali metals, alkaline earth metals, Zn, Co, Ce, Cr, Fe and La.

Non-Patent Document 2 suggests a nickel-supported catalyst on ceria, zirconia, and ceria zirconia compounds, and magnesia- and nickel-supported catalyst on a ceria zirconia compound used for a tri-reforming reaction from methane to carbon dioxide, steam and oxygen.

Meanwhile, as catalysts which use sulfur-containing materials such as town gas, isooctane, kerosene and propane and generate hydrogen for fuel cells from relatively lower hydrocarbons, Patent Document 9 discloses a mixture of: a porous support composed of aluminum and magnesium; and oxides with at least one element selected from silicon, zirconium, cerium, titanium, aluminum, yttrium, scandium, Group 1A elements, and Group 2A elements.

In addition, as a catalyst which generates hydrogen from lower hydrocarbons such as propane, butane or town gas, there is a catalyst which contains magnesium, aluminum and nickel as constituent elements and further contains silicon, as mentioned in Patent Document 10.

However, hydrocarbons, which are the target of these catalysts, are readily decomposed to lower chain hydrocarbons. In addition, sulfur, which may poison catalysts, contained in the materials is limited to 50 ppm or less, as mentioned in Patent Document 9. That is, in relation to these known catalysts, no research was performed in regard to reforming of heavy hydrocarbons such as tar under a tar-containing gas atmosphere containing a high concentration of sulfur.

In addition, in accordance with the recent global warming problem, use of biomass, a carbonaceous material as an efficient method of reducing carbon dioxide discharge amounts has attracted much attention and research associated with performing high-efficiency energy conversion of biomass is being carried out. Recently, in addition, from the viewpoint of securing energy resources, research associated with the effective utilization of coal which has been actively pursued in the past has been reconsidered for practical application. Of these, regarding methods in which tar produced by carbonizing biomass is gasified to produce a crude gas (unpurified gas) and the sensible heat is used, technologies disclosed in Patent Document 11 or Patent Document 12 based on catalyst reforming of tar using a catalyst have been variously reviewed. However, the methods use expensive precious metals and thus have problems of low economic efficiency and short catalyst lifespan.

RELATED ART DOCUMENT

Patent Document

[Patent Document 1] Japanese Examined Patent Application, Second Publication No. S59-44346
[Patent Document 2] Japanese Unexamined Patent Application, First Publication No. S58-76487
[Patent Document 3] Japanese Unexamined Patent Application, First Publication No. H8-134456
[Patent Document 4] Japanese Unexamined Patent Application, First Publication No. 2003-55671
[Patent Document 5] Japanese Unexamined Patent Application, First Publication No. 2008-239443
[Patent Document 6] Japanese Unexamined Patent Application, First Publication No. 2000-248286
[Patent Document 7] Japanese Unexamined Patent Application, First Publication No. 2000-469
[Patent Document 8] Japanese Unexamined Patent Application, First Publication No. 2006-61760
[Patent Document 9] Japanese Unexamined Patent Application, First Publication No. 2007-313496
[Patent Document 10] Japanese Unexamined Patent Application, First Publication No. 2008-18414
[Patent Document 11] Japanese Unexamined Patent Application, First Publication No. 2008-132458
[Patent Document 12] Japanese Unexamined Patent Application, First Publication No. 2007-229548

Non-Patent Documents

[Non-Patent Document 1] F. Basile et al., Stud. Surf. Sci. Catal., Vol. 119 (1998)
[Non-Patent Document 2] C. Song et al., Catalysis Today, Vol. 98 (2004)

DISCLOSURE OF THE INVENTION

Problems to be Solved by the Invention

An object of the present invention is to provide a catalyst for reforming a tar-containing gas, which stably converts a tar-containing gas (such as crude gas or purified gas) generated when carbonaceous materials such as coal or biomass are thermally decomposed, which contains tar composed of heavy chain hydrocarbons, condensed polycyclic aromatic hydrocarbons or the like, as a main component, and contains a high concentration of hydrogen sulfide in the presence of a catalyst without using any platinum groups into light chemicals such as methane, carbon monoxide and hydrogen, a method for preparing a catalyst for reforming a tar-containing gas, a method for reforming a tar-containing gas using the catalyst for reforming a tar-containing gas, and a method for regenerating a catalyst for reforming a tar-containing gas.

Means for Solving the Problems

The present invention utilizes the following means to solve the problems mentioned above.

(1) In a first aspect, provided is a catalyst for reforming a tar-containing gas, wherein the catalyst contains at least one composite oxide as oxide containing nickel, magnesium, cerium and aluminum and the content of alumina as a single compound is limited to 5% by mass or less.

(2) In the catalyst mentioned in (1), the crystal structure of the composite oxide may include NiMgO crystal phase, $MgAl_2O_4$ crystal phase and $CeO_2$ crystal phase.

(3) In the catalyst mentioned in (2), of the respective crystal phases, the size of crystallites of the (200) plane of NiMgO crystal phase may be 1 nm to 50 nm, the size of crystallites of the (311) plane of $MgAl_2O_4$ crystal phase may be 1 nm to 50 nm, and the size of crystallites of the (111) plane of $CeO_2$ crystal phase may be 1 nm to 50 nm, in which the sizes of crystallites are obtained by X-ray diffraction measurement.

(4) In a second aspect, provided is a method for preparing a catalyst for reforming a tar-containing gas including: coprecipitating a precipitate from a mixed solution containing a nickel compound, a magnesium compound and a cerium compound; burning the precipitate; adding an alumina powder and water, or an alumina sol to the burned precipitate to produce a mixture; and baking the mixture.

(5) In the method mentioned in (4), the baking may include drying and grinding the mixture, or drying, burning, grinding and molding the mixture, before baking the mixture.

(6) In a third aspect, provided is a method for preparing a catalyst for reforming a tar-containing gas, including: coprecipitating a precipitate from a mixed solution containing a nickel compound, a magnesium compound and a cerium compound; adding an alumina powder and water, or an alumina sol to the precipitate to produce a mixture; and baking the mixture.

(7) In the method mentioned in (6), the baking may include drying and grinding the mixture, or drying, burning, grinding and molding the mixture, before baking the mixture.

(8) In a fourth aspect, provided is a method for preparing a catalyst for reforming a tar-containing gas, including: coprecipitating a precipitate from a mixed solution containing a nickel compound, a magnesium compound and a cerium compound; adding an alumina powder and water, or an alumina sol to the precipitate to produce an intermediate mixture; burning the intermediate mixture; adding an alumina powder and water, or an alumina sol to the intermediate mixture to produce a mixture; and baking the mixture.

(9) In the method mentioned in (8), the baking may include drying and grinding the mixture, or drying, burning, grinding and molding the mixture, before baking the mixture.

(10) In a fifth aspect, provided is a method for preparing a catalyst for reforming a tar-containing gas, including: coprecipitating a mixture from a mixed solution containing a nickel compound, a magnesium compound, a cerium compound and an aluminum compound; and baking the mixture.

(11) In the method mentioned in (10), the baking may include drying and grinding the mixture, or drying, burning, grinding and molding the mixture, before baking the mixture.

(12) In a sixth aspect, provided is a method for reforming a tar-containing gas using the catalyst for reforming a tar-containing gas prepared by the method according to any one of (4) to (11), including: bringing hydrogen, carbon dioxide and water vapor in a tar-containing gas generated when a carbonaceous material is thermally decomposed, in contact with the catalyst for reforming a tar-containing gas.

(13) In the method mentioned in (12), the method may include collecting by condensation of tar in the tar-containing gas generated when a carbonaceous material is thermally decomposed; gasifying the tar by heating; and bringing at least one of hydrogen, carbon dioxide and water vapor incorporated from the outside in contact with the catalyst for reforming a tar-containing gas.

(14) In the method mentioned in (13), when bringing at least one of hydrogen, carbon dioxide and water vapor incorporated from the outside in contact with the catalyst for reforming a tar-containing gas, an oxygen-containing gas incorporated from the outside is further brought in contact with the catalyst.

(15) In the method mentioned in (12), the tar-containing gas may contain 20 ppm to 4,000 ppm of hydrogen sulfide.

(16) In the method mentioned in (12), the tar-containing gas may be a carbonized gas generated when coal is carbonized.

(17) In the method mentioned in (12), the tar-containing gas may be a coke oven gas discharged from a coke oven.

(18) In the method mentioned in (12), the tar-containing gas may be a carbonized gas generated when biomass is carbonized.

(19) In the method mentioned in (12), the catalyst for reforming a tar-containing gas may be brought in contact with the tar-containing gas under an atmosphere at 600 to 1,000° C.

(20) In a seventh aspect, provided is a method for regenerating a catalyst for reforming a tar-containing gas by bringing the catalyst in contact with one of water vapor and air, in a case where performance of the catalyst is deteriorated by at least one of carbon deposition and sulfur poisoning when performing the method for reforming the tar-containing gas mentioned in (12).

Advantageous Effects of Invention

According to the present invention, a tar-containing gas generated when coal or biomass is thermally decomposed can be stably converted into light chemicals such as carbon monoxide or hydrogen. In particular, although the tar-containing gas contains a high concentration of hydrogen sulfide, the gas is brought in contact with the catalyst without desulfurization to reform tar in the crude gas, or reform hydrocarbon components in the purified gas and thereby convert the tar-containing gas into light chemicals such as carbon monoxide or hydrogen.

For example, a tar-containing gas such as crude COG or biomass-carbonized gas which contains about 20 ppm to about 4,000 ppm of hydrogen sulfide can be also highly efficiently and stably converted into light chemicals through a reforming reaction using the catalyst for reforming a tar-containing gas according to the present invention.

In addition, the catalyst for reforming a tar-containing gas prepared by the preparation method of the present invention exhibits high tar-containing gas reformation activity and a low carbon deposition ratio and stably maintains activity for a long period of time, as compared to catalysts prepared by an impregnation support method.

DESCRIPTION OF EMBODIMENTS

Figure 1:
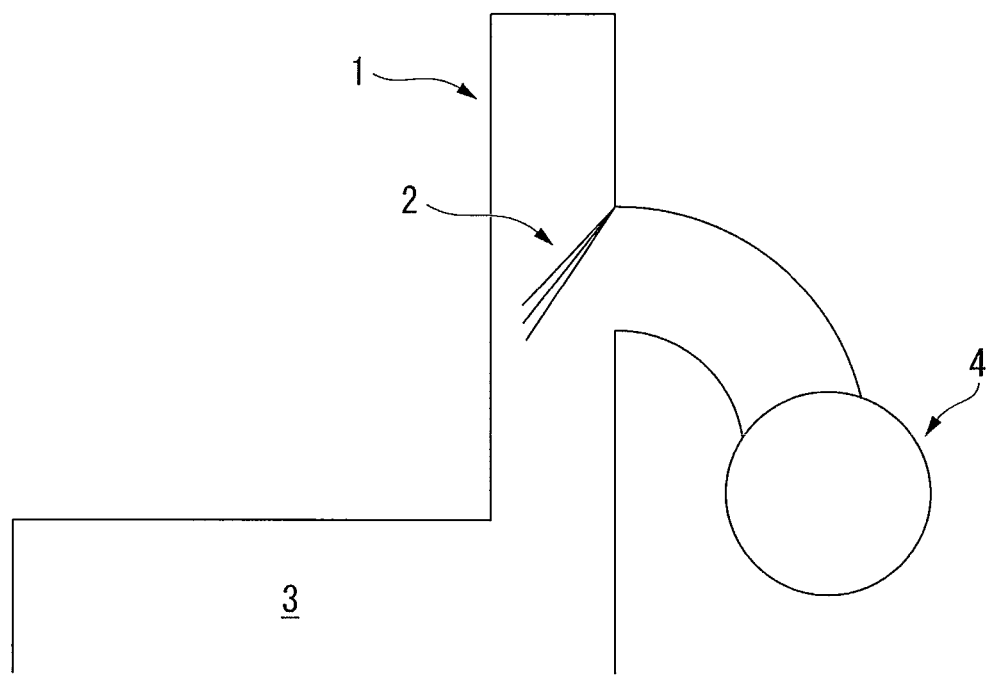
FIG. 1 is a view illustrating a part in which a coke oven gas is discharged from a coke oven.

The present inventors actively researched a method for stably converting a tar-containing gas (crude gas) which contains a high concentration of hydrogen sulfide generated when carbonaceous materials such as coal or biomass are thermally decomposed into light chemicals such as carbon monoxide and hydrogen by reacting the tar-containing gas as the crude gas containing a high concentration of hydrogen sulfide with a catalyst. As a result, the inventors discovered that activity deterioration of the catalyst due to sulfur poisoning or carbon deposition can be suppressed, when a tar-containing gas (such as crude gas or purified gas) which contains a high concentration of hydrogen sulfide and contains tar composed of condensed polycyclic aromatic hydrocarbon as a main component is reformed, as the catalyst for reforming a tar-containing gas, by using a metal oxide which (1) contains nickel, magnesium, cerium and aluminum as constituent elements, (2) contains 5% by mass or less of an alumina phase (alumina as a single compound), and (3) contains at least one composite oxide, preferably, contains crystal phases of NiMgO, MgAl$_2$O$_4$, and CeO$_2$ as main components.

This catalyst can reform tar in the crude gas without deterioration over time and convert the tar into light chemicals such as carbon monoxide or hydrogen, since activity deterioration of the catalyst due to sulfur poisoning or carbon deposition is suppressed.

That is, the present inventors, unlike with methods for preparing catalysts by a conventional impregnation support method, discovered a method for preparing a catalyst for reforming a tar-containing gas including coprecipitating a precipitate from a mixed solution containing a nickel compound, a magnesium compound and a cerium compound, and adding an aluminum component during the coprecipitation or after formation of the precipitate, followed by drying and baking. A solid phase crystallization method has a variety of characteristics in that (1) fine precipitation of active metals and thus rapid reaction are possible, (2) sintering can be suppressed and activity deterioration can be prevented, since the precipitated active metals are strongly bonded to matrices, and (3) the precipitated active metals are adsorbed on the matrices by baking and regeneration is thus possible. In one embodiment of the present invention, in accordance with this solid phase crystallization method, active nickel elements are preliminarily compounded with matrices such as alumina and magnesia, cerium is further incorporated therein, a mixed solution containing a nickel compound, a magnesium compound and a cerium compound is coprecipitated to produce a precipitate, and an aluminum component is added thereto during the coprecipitation, or after formation of the precipitate, dried and baked to obtain the catalyst. When this catalyst comes in contact with the reductive gas in the tar-containing gas or the reductive gas before the reaction, the nickel metal is finely precipitated in the form of a cluster on the surface of the oxide from the oxide matrix. Using this phenomenon even under harsh conditions in which the gas containing a high concentration of sulfur components which may cause sulfur poisoning and a high amount of components such as tar which may readily cause carbon deposition of heavy hydrocarbons or the like, the surface area of active metals is large and active metals can be newly precipitated in spite of sulfur poisoning, and heavy hydrocarbons can be converted into light hydrocarbons with a high efficiency.

Simultaneous and sequential impregnation methods and the like are known as impregnation support methods. In accordance with the simultaneous impregnation method, a mixed solution of catalytically active components or crude catalyst components is supported in a porous oxide support such as alumina and silica, followed by drying. Meanwhile, in accordance with the sequential impregnation method, a solution of catalytically active components or crude catalyst components is supported stepwise in a porous oxide support such as alumina or silica, followed by drying.

In addition, the present inventors discovered a method for preparing a catalyst for reforming a tar-containing gas using oxide which contains nickel, magnesium, cerium and aluminum, preferably contains at least one composite oxide and contains 5% by mass or less of an alumina phase (alumina as a single compound), wherein the method includes coprecipitating a precipitate from a mixed solution containing a nickel compound, a magnesium compound and a cerium compound, and adding an aluminum component during the coprecipitation or after formation of the precipitate, followed by drying and baking. The inventors also discovered that the catalyst obtained by the preparation method exhibits superior tar-containing gas reforming activity and enables reforming for a long period of time. In addition, this catalyst can be regenerated by contact with water vapor and/or air, although catalytic performance is deteriorated by carbon deposition or sulfur poisoning and thus a regenerated catalyst substantially maintains performance prior to deterioration.

Hereinafter, first to fourth embodiments of the present invention will be described in detail First Embodiment Catalyst for Reforming Tar-Containing Gas The catalyst for reforming a tar-containing gas according to a first embodiment of the present invention is an oxide which contains nickel, magnesium, cerium and aluminum. The catalyst for reforming a tar-containing gas contains at least one composite oxide (that is, composed of one or more composite oxides, or a mixture of a composite oxide and a simple metal oxide), and contains 5% by mass or less of alumina (alumina phase) as a simple compound.

The nickel serves as a main active component which performs a reforming reaction between heavy hydrocarbons, and water vapor, hydrogen or carbon dioxide present in a gas or incorporated from the outside. In a case where a high concentration of hydrogen sulfide is contained in the tar-containing gas, since the nickel metal is finely dispersed in the form of a cluster on the surface of catalyst and thus has an increased surface area, and new active metal particles are finely precipitated from the matrix (NiMgO phase) under a reduction atmosphere, although active metal particles are poisoned during the reaction, deterioration of activity by sulfur poisoning does not thus readily occur. Active metal particles can be precipitated in the form of a fine cluster under a reduction atmosphere from this matrix compound. In addition, tar composed of condensed polycyclic aromatic compounds exhibits superior reactivity in a high temperature state immediately after carbonization and is finely dispersed, brought in contact with a highly active nickel metal having a high specific surface area and is thus highly efficiently converted and decomposed into light hydrocarbons. In addition, sintering between nickel particles is suppressed and catalytic activity is not readily deteriorated during the reaction for a long time, since the precipitated nickel is strongly bonded to the matrix compound.

Of the components compounded with the nickel element, magnesia is a basic oxide which can absorb carbon dioxide and thus reacts with hydrocarbon-derived deposited carbon as a main active component element and is removed by oxidation in the form of carbon monoxide. For this reason, the surface of catalyst can be stably maintained and catalytic performance can be stably maintained for a long time.

Here, the crystallite size of the (220) plane obtained by X-ray diffraction measurement of nickel-magnesium solid solution oxide (NiMgO phase) is preferably 1 nm to 50 nm. When the diameter is 1 nm or more, the growth of NiMgO is sufficient and precipitation of Ni clusters from the NiMgO phase can be sufficiently performed. For this reason, deterioration of catalytic activity may be suppressed. In addition, when the size is 50 nm or less, a case where particle growth of the NiMgO phase is excessive and an increase of Ni particles precipitated therefrom can be prevented. Accordingly, deterioration of activity by deterioration of the surface area or generation of carbon deposition can be avoided.

Cerium is not solubilized in nickel-magnesium solid solution oxide and is present near the surface of nickel-magnesium oxide (NiMgO) as cerium oxide (CeO$_2$), can exert oxygen absorbance and discharge performance even under a tar-containing gas atmosphere and can thus fulfill its performance including reduction of nickel from nickel-magnesium solid solution oxide and precipitation of a greater amount of nickel metal particles. In addition, lattice oxygen of cerium oxide reacts with deposited carbon to produce carbon monoxide or carbon dioxide and thereby reduces the amount of deposited carbon on the catalyst.

Here, the crystallite size of the (111) plane obtained by X-ray diffraction measurement of the cerium oxide ($CeO_2$ phase) is preferably 1 nm to 50 nm. When the size is 1 nm or more, the growth of $CeO_2$ is sufficient and can sufficiently exert the intrinsic capability of absorbing and discharging oxygen. As a result, the effect of precipitation of Ni particles from the adjacent NiMgO phase can be obtained and sufficient catalytic activity can be thus exerted. In addition, when the diameter is 50 nm or less, an area at which $CeO_2$ contacts the adjacent NiMgO phase decreases and the lack of possibility for sufficient facilitation of precipitation of Ni particles from the NiMgO phase can be avoided. Accordingly, sufficient catalytic activity can be expressed.

Alumina is preferably not present alone as a single alumina phase, but serves as a support in a reaction field. In addition, alumina partially reacts with a nickel magnesium compound to form $MgAl_2O_4$, active species of nickel precipitated on the surface from each crystal phase of NiMgO are dispersed in a high level by finely fragmenting the NiMgO crystal phase and, in particular, it is difficult to form an eccentrically-located part or the like of nickel which readily becomes a starting point of carbon deposition and fulfills the capability for exerting a carbon deposition property. According to the method for preparing a catalyst for reforming a tar-containing gas according to an embodiment of the present invention mentioned below, in a preferred embodiment, aluminum entirely reacts with a compound of nickel or magnesium to form a composite oxide and thereby prepare a catalyst for reforming a tar-containing gas which contains 5% by mass or less of alumina (alumina phase) as a single compound. In addition, it is preferable that alumina (alumina phase) as a single compound be about 0% by mass and may be for example limited to 3% by mass or less, or 1% by mass or less.

Here, the crystallite size of the (311) plane obtained by X-ray diffraction measurement of a magnesium-aluminum compound ($MgAl_2O_4$ phase) composed of alumina is preferably 1 nm to 50 nm. When the size is 1 nm or more, growth of the $MgAl_2O_4$ phase is sufficient, fineness of the NiMgO phase is readily achieved and catalytic activity can be sufficiently exerted. In addition, practical problems in which crush strength is decreased by deterioration in the strength of molded articles can be thus avoided. In addition, when the size is 50 nm or less, an excessive increase of the composition of Ni in the NiMgO phase can be avoided by extracting a large amount of Mg component from the NiMgO phase. That is, the possibility of insufficient catalytic activity caused by excessive increase of Ni particles precipitated from the NiMgO phase can be avoided.

The term "carbonaceous material" used herein refers to a material containing carbon which produces tar by thermal decomposition, but includes a wide range of materials which contain carbon as a constituent element of coal, biomass, plastic container packages or the like. Of these, the term "biomass" refers to wood waste such as forest land residues, forest thinning materials, non-used timbers, lumber residues, building waste, and chaff, or secondary products such as wood chips or pellets containing wood waste as a material, paper wastes such as waste paper which cannot be reused as recycled paper, agricultural residues, food waste such as kitchen waste, active sludge or the like.

In addition, the term "tar generated when a carbonaceous material is thermally decomposed" refers to an organic compound containing 5 or more carbon atoms which is a liquid at room temperature, although its characteristics may be varied by a thermally decomposed material, which is a mixture composed of chain hydrocarbons, aromatic hydrocarbons or the like. When the coal is thermally decomposed, examples of main components include condensed polycyclic aromatic compounds such as naphthalene, phenanthrene, pyrene and anthracene, when biomass, in particular, wood waste is thermally decomposed, examples of the main component include benzene, toluene, naphthalene, indene, anthracene and phenol, and when food waste-based biomass is thermally decomposed, examples of the main component include, but are not limited to, hetero compounds which contain a hetero element such as nitrogen in a 6- or 5-numbered ring such as indole and pyrrole, in addition to the mentioned materials. The thermally decomposed tar is present in a gas state at a high temperature immediately after thermal decomposition. In addition, the tar is present in the form of mist in purified COG which is cooled to about room temperature.

In addition, as a method for thermally decomposing the carbonaceous material, in a case where coal is used as a material, a coke oven is generally used, and in a case where biomass is used as a material, an outer heating rotary kiln, or a mobile phase passage, a flow phase passage or the like may be used, although the method is not limited thereto.

In addition, a reaction for reforming a tar-containing gas in which gasification of the tar-containing gas is performed by contact is a reaction which converts tar, and heavy hydrocarbons, into light chemical substances such as methane, carbon monoxide or hydrogen. This reaction may be a hydrogenation reaction, steam reforming reaction, dry reforming reaction or the like which may occur between hydrogen in the tar-containing gas, and water vapor, carbon dioxide, oxygen or the like, although this reaction has a complicated reaction path and is thus not certainly clear. In addition, when hydrogen, steam or carbon dioxide is incorporated from the outside, the reaction is performed with a higher efficiency. In a case where the series of reactions are applied to actual equipment for an endothermic reaction, the gas having high-temperature sensible heat which is supplied to a reactor is reformed in the catalyst layer, and the temperature of gas decreases in an outlet thereof; but, in a case where heavy hydrocarbon component such as tar is reformed with a higher efficiency, if necessary, air or oxygen is incorporated into the catalyst layer, the reforming reaction may be further performed while the catalyst layer is maintained to a some extent by a combustion heat at which a partial hydrogen or hydrocarbon component is combusted.

In addition, in the catalyst for reforming a tar-containing gas according to this embodiment, the content of nickel as a main active component is preferably 1 to 50% by mass. When the content is 1% by mass or more, reforming performance of nickel can be sufficiently exerted. When the content is 50% by mass or less, the contents of magnesium, cerium and aluminum which form a matrix can be suitably maintained, and an increase in concentration of nickel metal precipitated on the catalyst and coarsening can be avoided. For this reason, deterioration of performance over time can be avoided under the reaction condition.

In addition, the content of magnesium is preferably 1 to 45% by mass. When the content is 1% by mass or more, it is easy to realize basic oxide characteristics of magnesia and it is easy to stably maintain catalytic performance for a long time through suppression of carbon deposition of hydrocarbons. When the content of magnesium is 45% by mass or less, the contents of other metals such as nickel, cerium and aluminum can be suitably maintained and reforming activity of catalyst can be sufficiently exerted. In addition, when the content of magnesium is lower than 1% by mass and the level of nickel in the solid solution of magnesium and nickel increases, nickel particles precipitated from the solid solution phase are readily coarsened, and the amount of deposited carbon on the catalyst tends to readily increase after the reforming reaction of the tar-containing gas.

In addition, the content of cerium is preferably 1 to 40% by mass. When the content is 1% by mass or more, it is possible to prevent the difficulty of precipitation of nickel from nickel magnesia by the oxygen storage capacity of cerium oxide. When the content is 40% by mass or less, the content of magnesia which suppresses precipitation of nickel or carbon as a main active component can be maintained at a suitable range and reforming activity of the catalyst can be sufficiently exerted.

In addition, the content of aluminum converted to alumina is preferably 20 to 80% by mass. When the content is lower than 20% by mass, a ceramic is mainly composed of a nickel magnesia (NiMgO) phase, the NiMgO phase is not made fine due to a low proportion of the $MgAl_2O_4$ phase, Ni particles precipitated therefrom are coarsened and activity decreases or strength considerably decreases when molding. When the content is higher than 80% by mass, the ratio of magnesia which suppresses precipitation of nickel as a main active component or carbon decreases and reforming activity of the catalyst may be not sufficiently exerted.

In addition, the catalyst in which the content of nickel is 1 to 35% by mass, the content of magnesium is 1 to 35% by mass, the content of cerium is 3 to 35% by mass and the content of converted alumina is 20 to 80% by mass is more preferable.

In addition, the catalyst prepared by the method may be a powder or molded material. When the catalyst is a powder, it is preferable that the particle diameter or surface area be suitably adjusted. When the catalyst is a molded material, it is preferable that a fine pore volume, a fine pore diameter, a shape or the like be suitably adjusted through balance between the surface area and strength. The molded material may have any shape of spherical, cylindrical, ring, wheel and granular shapes and may be a catalyst component coated on a metallic or ceramic honeycomb substrate. In addition, it is preferable that respective starting materials be preliminarily prepared by calculation in order to adjust the contents of respective metal species within this range. In addition, once the catalyst has the desired component composition, the catalyst may be prepared in accordance with a previous blending in the subsequent process.

In addition to the element mentioned above, the catalyst may contain impurities inevitably incorporated in the process of preparing the catalyst or other components which do not change catalytic performance, but it is preferable that as few impurities as possible be incorporated.

In addition, the method for measuring the contents of respective metal species constituting the reforming catalyst may be a scanning high-frequency inductively coupled plasma (ICP) method. Specifically, a sample is ground and an alkali dissolving agent (for example, sodium carbonate, sodium borate or the like) is added thereto, followed by heating and melting in a platinum crucible. The resulting solution is cooled and entirely dissolved in a hydrochloric acid solution under heating. When the resulting solution is injected into an ICP analysis apparatus, the sample solution is atomized and thermally excited in a high-temperature plasma state in the apparatus and emits a luminescence emission spectrum with an intrinsic wavelength of the element, when it returns to a ground state. The species and amounts of the elements contained therein can be qualitatively or quantitatively analyzed from the emission wavelength and intensity.

In addition, in order to confirm whether the prepared oxide forms the desired crystal structure, evaluation of the catalyst can be performed through wide-angle X-ray diffraction as follows. First, raw materials are set on a holder for powder samples, CuKα rays are generated at a power of 40 kV and 150 mA using RINT1500 manufactured by Rigaku, and crystal structures are evaluated from peak positions and intensities through measurement under conditions of a divergence slit and a scattering slit of 1°, a light-receiving slit of 0.15 mm, a monochrome light-receiving slit of 0.8 mm, a sampling width of 0.01 deg, and a scanning rate of 2 deg/min using graphite as a monochromator. With respect to measurement profiles thus obtained, in particular, peaks (111) of $CeO_2$ plotted at 2θ of about 29 deg, peaks (311) of $MgAl_2O_4$ plotted at 2θ of about 37 deg, and peaks (200) of NiMgO plotted at 2θ of about 43 deg, FWHM (full widths at a half position of maximum height of these peaks) are calculated using the following Scherrer's equation (Equation 1) from the values.

$$D_{hkl}=K\lambda/\beta \cos \theta \quad \text{(Equation 1)}$$

In Equation 1, $D_{hkl}$ enables highly precise evaluation of the crystallite size of $CeO_2$ since an S/N ratio is high when evaluated by diffraction lines (111) having the highest intensity in XRD measurement of $CeO_2$ due to the crystallite size perpendicular to the plane (hkl). Similarly, $MgAl_2O_4$ is estimated by diffraction lines (311) and NiMgO is estimated by diffraction lines (200). K is a constant, but 0.9 in that β is FWHM. λ is a measured X-ray wavelength and the value measured herein is 1.54056 Å. In addition, β is broadening of diffraction lines by the size of crystallites and is obtained using FWHM. θ is a Bragg angle of $CeO_2$ (111), $MgAl_2O_4$ (311), or NiMgO (200) diffraction lines.

In addition, the strength of the molded catalyst was measured using a Kiya hardness tester. Specifically, the molded material is placed on a stage of the hardness tester, pressed from the top, and the strength at which the molded material is broken is measured based on an N (Newton) unit and strength (crush strength) is thus evaluated.

Second Embodiment

Method for Preparing Catalyst for Reforming Tar-Containing Gas

Figure 3:
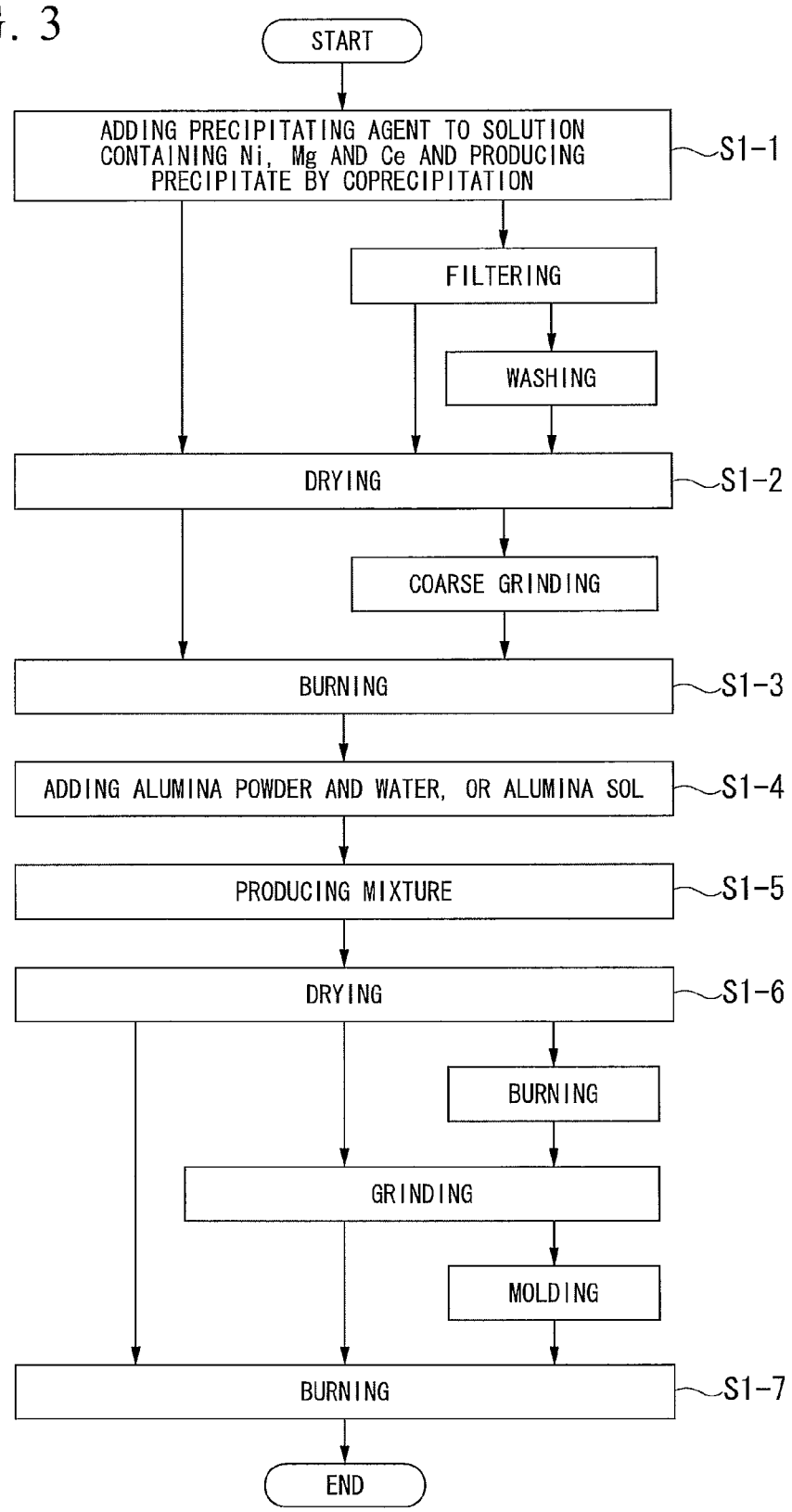
FIG. 3 is a flow chart illustrating an example of a method for preparing a catalyst for reforming a tar-containing gas according to one embodiment.
Figure 4:
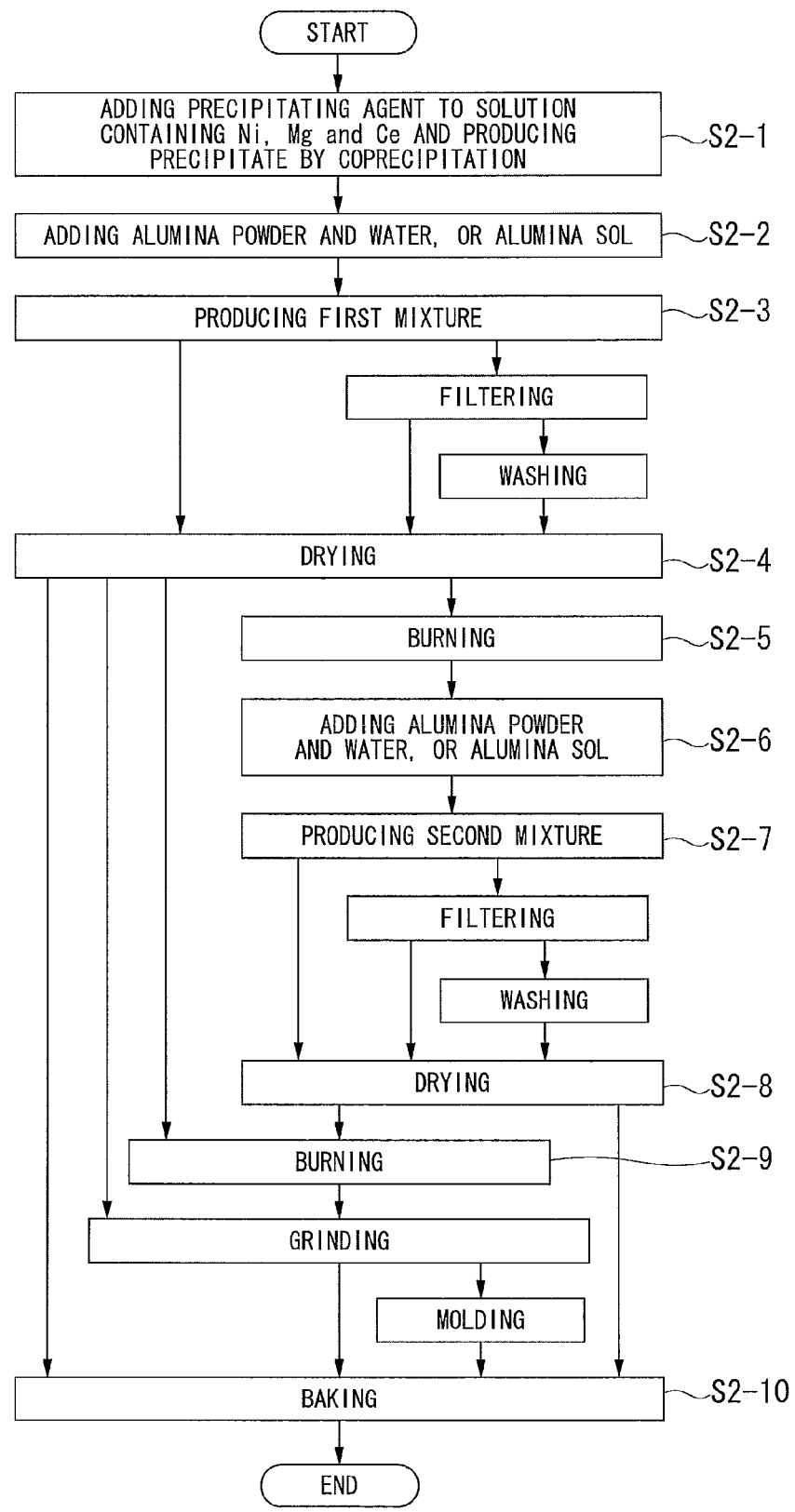
FIG. 4 is a flow chart illustrating another example of a method for preparing a catalyst for reforming a tar-containing gas according to another embodiment.
Figure 5:
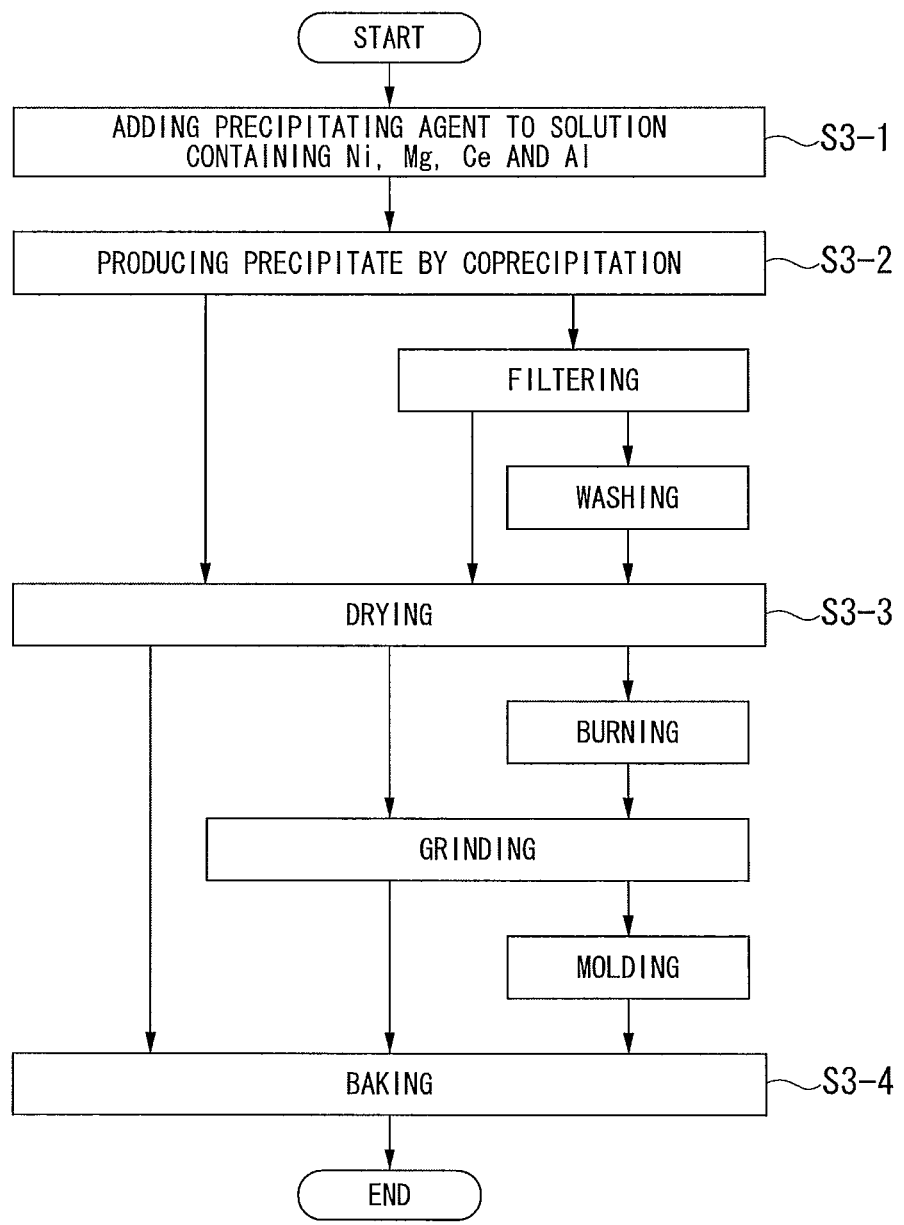
FIG. 5 is a flow chart illustrating another example of a method for preparing a catalyst for reforming a tar-containing gas according to still another embodiment.

Hereinafter, a method for preparing the catalyst for reforming a tar-containing gas according to the second embodiment of the present invention will be described with reference to flow charts shown in FIGS. 3 to 5.

The second embodiment of the present invention is a method for preparing a catalyst for reforming tar used for reforming the tar-containing gas. The term "catalyst for reforming the tar-containing gas" used herein refers to a metal oxide catalyst which contains nickel, magnesium, cerium and aluminum as constituent metals. This catalyst is prepared as follows.

First, a precipitate is produced by coprecipitation from a solution of a nickel compound, a magnesium compound and a cerium compound. During this coprecipitation, or after production of precipitates, an aluminum component is added thereto to produce an aluminum mixture containing nickel, magnesium, cerium and aluminum. This aluminum mixture is dried and baked to prepare a catalyst composed of a mixture containing oxides of nickel, magnesium, cerium and aluminum (oxide and/or composite oxide).

The catalyst prepared by the preparation method enables high homogeneity of respective components in catalyst materials, as compared to catalysts prepared by conventional impregnation support methods. Accordingly, the catalyst enables the nickel of the active component to be finely precipitated. In addition, the cerium compound of the crude catalyst is homogeneously dispersed and functions thereof can be efficiently exerted. Accordingly, the reforming activity of tar-containing gas can be improved and stable activity can be maintained for a long period of time.

Hereinafter, a specific first method will be described with reference to a flow chart shown in FIG. 3.

First, a precipitating agent is added to a mixed solution of a nickel compound, a magnesium compound and a cerium compound. Then, nickel, magnesium and cerium are coprecipitated to produce a precipitate (S1-1). Then, the precipitate is dried (S1-2) and further burned (S1-3). As a result of the burning, oxides of nickel, magnesium and cerium are produced. To these oxides, an alumina powder and water, or an alumina sol is added (S1-4). Furthermore, these components are mixed to produce a mixture (S1-5). This mixture is dried (S1-6) and further baked (S1-7). In particular, the molded catalyst prepared by the method has a high strength.

Hereinafter, a specific second method will be described with reference to a flow chart shown in FIG. 4.

First, a precipitating agent is added to a mixed solution of a nickel compound, a magnesium compound and a cerium compound to coprecipitate nickel, magnesium and cerium and thereby produce a precipitate (S2-1). Then, an alumina powder and water, or an alumina sol is added to the precipitate (S2-2). Then, the precipitate is mixed to produce a mixture (an intermediate mixture) (S2-3). Then, the mixture is dried (S2-4) and further burned (S2-10) to prepare a catalyst. In addition, after the intermediate mixture thus produced is dried (S2-4) and further burned (S2-5), an alumina powder and water, or an alumina sol may be further added thereto (S2-6). Furthermore, these components are mixed to produce a mixture (S2-7). This mixture is dried (S2-8) and further baked (S2-10) to prepare a catalyst. In addition, the baking may be performed after drying (S2-9).

Hereinafter, a specific third method will be described with reference to a flow chart shown in FIG. 5.

First, a precipitating agent is added to a mixed solution of a nickel compound, a magnesium compound, an aluminum compound and a cerium compound (S3-1). As a result, nickel, magnesium, aluminum and cerium are coprecipitated to produce a precipitate (S3-2). Then, the precipitate (mixture) is dried (S3-3) and further baked (S3-4). By this method, a catalyst may be prepared. That is, the aluminum component is not added to the precipitate obtained by coprecipitating it from the solution of a nickel compound, and a magnesium compound and a cerium compound and may be added as a coprecipitated component to a mixed solution.

Here, the drying of the precipitate or mixture in the respective methods may be in accordance with a general method, particularly, regardless of a temperature or drying method. The dried coprecipitate is baked (burned) after being coarsely ground, if necessary. In addition, in a case where the powder phase of the dried precipitate is maintained by drying in a fluidized bed or the like, coarse grinding is unnecessary.

It is preferable that the precipitate or mixture be filtered prior to drying the precipitate or mixture, from the viewpoint of reducing drying labor. In addition, it is more preferable that the precipitate after filtering be washed with pure water or the like from the viewpoint of reducing the amount of impurities.

In addition, the baking of the mixture may be carried out in the air at a temperature of 600 to 1300° C. When the baking temperature is high, sintering of the mixture is performed and strength thus increases, but specific surface area decreases and catalytic activity is thus deteriorated. It is preferable that the baking temperature be determined while taking into consideration the balance therebetween. After baking, the mixture may be used as a catalyst, and may be used as a molded material obtained by molding such as press molding. In addition, a burning or molding process may be incorporated between the drying and baking. In this case, the burning may be carried out in the air at 400 to 800° C. and the molding may be carried out by press molding.

Even in a case of tar-containing gas which contains a large amount of hydrogen sulfide generated when a carbonaceous material is thermally decomposed and is composed of condensed polycyclic aromatic material which readily causes carbon deposition, heavy hydrocarbons such as accompanying tar can be reformed with a high efficiency and converted into light hydrocarbons composed of hydrogen, carbon monoxide or methane by using the catalyst prepared by the method. In addition, when catalytic performance is deteriorated, carbon deposited on the catalyst or sulfur absorbed thereon can be removed by bringing any one of water vapor and air in contact with the catalyst at a high temperature and the catalytic performance can be thus recovered. Accordingly, stable operation is possible for a long period of time.

The catalyst for reforming a tar-containing gas prepared by the preparation method enables the cerium and aluminum components to form a highly homogeneous mixture between the coprecipitate of nickel and magnesium, unlike a catalyst which is obtained simply by supporting respective components of nickel, magnesium and cerium on an alumina support, followed by drying and baking. That is, the mixture is subjected to a series of drying and baking processes, or a series of drying, burning, grinding, molding and baking processes, to form a sintered material in which cerium and aluminum are homogeneously dispersed in nickel and magnesium. With this sintered material, it is possible to obtain a molded material containing a small amount of deposited carbon at a high activity in that the nickel magnesia crystal phase is further made fine and Ni particles precipitated therefrom are highly finely dispersed.

More specifically, first, when a mixed solution containing a nickel compound, a magnesium compound and a cerium compound or an aluminum compound is prepared, it is preferable to use each metal compound having a high solubility in water. For example, inorganic salts such as nitrate, carbonate, citrate or chloride as well as organic salts such as acetate are preferably used. Particularly preferable is nitrate or carbonate or acetate which does not readily leave impurities which may cause catalyst poisoning after baking. In addition, any one which can change pH of the solution nickel, magnesium, cerium, or aluminum to neutrality or basicity which is mainly precipitated as hydroxide may be used as the precipitating agent used for the preparation of the precipitate. Examples of useful precipitating agents include an aqueous potassium carbonate solution, an aqueous sodium carbonate solution, an aqueous potassium hydroxide solution, an aqueous sodium hydroxide solution, an aqueous ammonia solution and a urea solution.

By using the catalyst for reforming a tar-containing gas prepared by the method, even in a case of a tar-containing gas composed of a condensed polycyclic aromatic material which contains a large amount of hydrogen sulfide generated when a carbonaceous material is thermally decomposed and readily causes carbon deposition, carbon deposition can be efficiently suppressed, and heavy hydrocarbons such as accompanying tar can be reformed with a high efficiency and can be stably converted into light chemicals composed of hydrogen, carbon monoxide or methane while reducing deterioration of the light chemicals over time.

In addition, in the method for reforming the tar-containing gas according to the embodiment, the reforming reaction is stably performed under a hydrogen sulfide-containing atmosphere, but poisoning decreases, as the concentration of hydrogen sulfide in the gas decreases. However, when the concentration of hydrogen sulfide in the gas is high (3,000 ppm to 4,000 ppm), the tar-containing gas can be sufficiently reformed. In addition, when the concentration of hydrogen sulfide in the gas is 3,000 ppm or less, the effects can be further sufficiently exerted.

Third Embodiment

Method for Reforming Tar-Containing Gas Using the Catalyst for Reforming Tar-Containing Gas Next, a method for reforming a tar-containing gas using a catalyst according to a third embodiment of the present invention will be described. In this reforming method, the tar-containing gas is reformed by bringing the tar-containing gas generated when a carbonaceous material is thermally decomposed, in contact with a hydrogen, carbon dioxide and water vapor in the presence of the catalyst, or in the presence of the catalyst after reduction.

The hydrogen, carbon dioxide and steam described above may be hydrogen, carbon dioxide and steam contained in the tar-containing gas, or hydrogen, carbon dioxide and steam suitably incorporated from the outside.

Here, although the tar gasification reaction in which tar in the tar-containing gas is gasified by contact reforming includes a complicated reaction path and is thus not certainly clear, a conversion reaction of a condensed polycyclic aromatic substance into light hydrocarbons such as methane through hydrogenolysis in the tar occurs between the substance and hydrogen present in the tar-containing gas or hydrogen incorporated from the outside, for example, represented by Equation 2 (in Equation 2, only methane is produced). In addition, as represented by (Equation 3), a conversion reaction of the condensed polycyclic aromatic substances in tar into hydrogen and carbon monoxide through dry reforming by carbon dioxide occurs between the substance and carbon dioxide present in the tar-containing gas or carbon dioxide incorporated from the outside. In addition, as represented by (Equation 4), steam reforming and water gas shift reaction occur between hydrocarbon and water vapor contained in the tar-containing gas or incorporated from the outside. In addition, besides tar in tar-containing gas, the hydrocarbon component undergoes the identical reaction.

$$C_nH_m+(2n-m/2)H_2 \rightarrow nCH_4 \quad \text{(Equation 2)}$$

$$C_nH_m+n/2CO_2 \rightarrow nCO+m/2H_2 \quad \text{(Equation 3)}$$

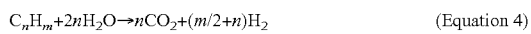

$$C_nH_m+2nH_2O \rightarrow nCO_2+(m/2+n)H_2 \quad \text{(Equation 4)}$$

Accordingly, when a gas having high calorific values such as methane is prepared, hydrogen is preferably incorporated from the outside. In addition, when hydrogen or carbon monoxide is prepared, carbon dioxide is preferably incorporated from the outside. In addition, when a greater amount of hydrogen is prepared, steam is preferably incorporated from the outside. In addition, in addition to tar, the hydrocarbon component undergoes reaction as depicted by the (Equation 2) to (Equation 4) above.

Here, it is preferable that the catalyst for reforming a tar-containing gas be reduced, but since the catalyst is reduced during the reaction, reduction thereof is unnecessary. However, in particular, when the tar-containing gas reforming catalyst requires a reduction treatment prior to reaction, the reduction condition in which nickel (active metal) particles are precipitated in the form of fine clusters from the catalyst according to one embodiment of the present invention is not limited particularly as long as it is a reductive atmosphere at relatively high temperatures. However, for example, under a gas atmosphere containing at least one of hydrogen, carbon monoxide and methane, or under a gas atmosphere in which steam is mixed with the reductive gas thereof steam, or under a gas atmosphere in which inert gas such as nitrogen is mixed with the gas. In addition, the reduction temperature is for example 500° C. to 1000° C., or preferably 600° C. to 1000° C.; reduction time depends on the amount of catalyst and is for example preferably 30 minutes to 4 hours, but is not limited particularly as long as it may be a time required to reduce the entirety of the incorporated catalyst.

The catalyst reactor is preferably a flow- or mobile-type reactor in a case where the catalyst is a powder, and is preferably a stationary- or mobile-type reactor in a case where the catalyst is a molded material. In addition, an inlet temperature of the catalyst layer is preferably 500 to 1,000° C. When the inlet temperature of a catalyst layer is lower than 500° C., the catalyst cannot substantially exert a catalytic activity when tar and hydrocarbons are reformed to light hydrocarbons such as hydrogen, carbon monoxide or methane and is not preferable. Meanwhile, when the inlet temperature of the catalyst layer exceeds 1000° C., there is an economical disadvantage due to expensive reforming equipment such as the necessity of heat resistance structure. In addition, more preferably, the inlet temperature of the catalyst layer is 550 to 1000° C. In addition, in a case where a carbonaceous material is coal, the reaction may be carried out at relatively high temperatures, and in a case where a carbonaceous material is biomass, the reaction may be carried out at relatively low temperatures.

Here, although a tar-containing gas generated when a carbonaceous material is thermally decomposed or partially oxidized is a tar-containing gas containing a concentration of hydrogen sulfide such as crude COG discharged from a coke oven, tar or hydrocarbon in the gas may be reformed and gasified. Here, thermal decomposition or partial oxidation specifically means that a tar-containing gas is prepared by carbonization or partial oxidization of a carbonaceous material for gasification. In the present coke oven, a coal material is charged in a coke oven, heated and carbonized to prepare coke, but as shown in FIG. 1, an accompanying coke oven gas is cooled by spraying an ammonia solution 2 (ammonia water) from an ascending pipe 1 of a blast furnace top and is collected in a dry main 4 as a collector. However, the gas component is rapidly cooled to 100° C. or less after spraying the ammonia solution 2, although the ascending pipe 1 of the coke oven 3 retains about 800° C. of sensible heat. Accordingly, it is impossible to efficiently use the sensible heat. For this reason, when heavy hydrocarbon components such as tar can be converted into fuel components of light hydrocarbons such as hydrogen or methane by efficiently using the gas sensible heat, energy amplification is caused and accompanying reductive gas volume greatly increases. That is, for example, when a process for preparing reduced iron using iron ore is possible, the amount of carbon dioxide emitted in a common blast furnace process in which iron ore is reduced by coke can be greatly reduced.

In addition, the application thereof is not limited to conventional fuels and there may be conversion into useful materials and into synthetic gases suitable for direct reduction of iron ore and may be thus useful as a high energy source. Furthermore, tar contained in crude COG can be converted over time while carbon is fed in the coke oven and then is removed, and is varied within a range of about 0.1 to about 150 g/Nm$^3$. In addition, similarly, the crude COG is cooled by spraying an ammonia solution 2 from an ascending pipe of the coke oven, collected in a dry main 4, and COG purified by a common method is purified by treatment using a primary cooler, a tar extractor, an electric collector or the like. In this case, the purified COG contains about 0.01 to about 0.02 g/Nm$^3$ of tar, the purified COG contains about 0.2 to 0.4 g/Nm$^3$ of naphthalene although purified with the subsequent final cooler, and the purified COG contains 5 to 10 g/Nm$^3$ of light oil although treated by a scrubber treatment. The tar-containing gas and purified COG can be converted into fuel components of light hydrocarbons such as hydrogen, carbon monoxide, similar to crude COG, and the possibility of reduction of the amount of emitted carbon dioxide or conversion thereof into useful materials can be expected.

Fourth Embodiment

Method for Regenerating Catalyst for Reforming Tar-Containing Gas

The tar reforming catalyst provided in a catalyst reactor undergoes deterioration of performance when carbon deposited on the surface of a catalyst during conversion from tar into light chemical substances such as hydrogen, carbon monoxide or methane, and the sulfur component in the thermal decomposition gas obtained by the thermal decomposition process is adsorbed on the catalyst. As a result, the performance of a catalyst is deteriorated. Accordingly, in a method for regenerating the deteriorated catalyst, water vapor is fed in a catalyst reactor, water vapor reacts with carbon to remove the carbon present on the surface of catalyst, or water vapor reacts with sulfur to remove sulfur adsorbed thereon and thereby regenerate the catalyst. In addition, air is incorporated instead of a part or entirety of water vapor, carbon combusts with oxygen in the air to remove carbon present on the surface of catalyst, or sulfur reacts with oxygen to remove sulfur adsorbed on the catalyst and thereby regenerate the catalyst. The regenerated catalyst may be entirely re-used, or may be partially replaced with a new catalyst.

EXAMPLE

Hereinafter, the present invention will be described in more detail with reference to examples, but is not limited to these examples.

Example 1

Nickel nitrate, cerium nitrate and magnesium nitrate were weighed such that a molar weight of the respective metal elements was adjusted to 1:1:8 and an aqueous potassium carbonate solution prepared at an elevated temperature of 60° C. was added to the aqueous mixed solution prepared at an elevated temperature of 60° C. As a result, nickel, magnesium and cerium were coprecipitated as hydroxides, followed by sufficiently stirring using a stirrer. Then, the resulting solution was aged at 60° C. by continuously stirring, filtered by suction and sufficiently washed with pure water at 80° C. After washing, the resulting precipitate was dried at 120° C. and coarsely ground. Furthermore, the resulting product was baked (burned) in the air at 600° C., ground, injected into a beaker and an alumina sol was added thereto. Then, the resulting material was sufficiently mixed with a mixer provided with a stirring blade, transferred to a recovery flask, mounted on a rotary evaporator, and suctioned with stirring to evaporate moisture. A compound of nickel, magnesium, cerium and aluminum adhered to the wall of a recovery flask was transferred to an evaporating dish, dried at 120° C. and burned at 600° C., and a powder was press-molded into a tablet form with a diameter of 3 mm using an extrusion molding machine to obtain a tablet molded material. The molded material was baked in the air at 950° C., to prepare a catalyst molded material in which $Ni_{0.1}Ce_{0.1}Mg_{0.8}O$ was mixed with 50% by mass of aluminum as alumina. The component of molded material was confirmed by ICP analysis. As a result, the component was confirmed to be the desired component. In addition, the prepared product was measured by XRD. As a result, it was demonstrated that the product was composed of NiMgO, $MgAl_2O_4$, and $CeO_2$ phases. A single phase of alumina was not present in the catalyst thus obtained. The respective crystallite sizes were 29 nm, 16 nm and 29 nm. In addition, the molded material was measured by a Kiya hardness tester. As a result, it could be seen that the material maintained a high strength of about 100 N.

60 cm$^3$ of this catalyst was set with a silica wool such that it was arranged in the center of a reaction tube made of SUS, a thermocouple was inserted into the center of the catalyst layer and this stationary phase reaction tube was set at a predetermined position.

Prior to the reforming reaction, first, a reactor was heated to a temperature of 800° C. under a nitrogen atmosphere and reduction treatment was performed for 30 minutes while a hydrogen gas was fed at a flow rate of 100 mL/min. Then, the gas constituting $H_2S$ (hydrogen:nitrogen=1:1) as a simulated parent gas of a coke oven gas was incorporated such that the total concentration shown in Table 1 was adjusted to 125 mL/min and the reaction was evaluated at a room pressure and at respective temperatures shown in Table 1. In addition, 1-methylnaphthalene, a representative material of a liquid material which is actually contained in tar and has a low viscosity at room temperature, as a simulated material generated during coal carbonization, was fed in a reaction tube at a flow rate of 0.025 g/min using a micro pump. In addition, pure water was incorporated in the reaction tube at a flow rate of 0.1 g/min using an accurate pump such that relation of S/C=3 was satisfied. The produced gas discharged from an outlet passed through a room temperature trap and an ice-temperature trap to remove naphthalene and moisture therefrom, the residue was added to a gas chromatographic system (HP6890 manufactured by Hewlett Packard), and TCD and FID analysis was performed in the system. The reaction level of reforming reaction (decomposition ratio of methylnaphthalene) was evaluated from methane selectivity, CO selectivity, $CO_2$ selectivity, and the ratio of carbon deposited on the catalyst. These rates were calculated from concentrations of respective components in the outlet gas in accordance with the following Equations 5 to 8.

Methane selectivity (%)=(volume of $CH_4$)/(C input of supplied 1-methylnaphthalene)×100 (Equation 5)

CO selectivity (%)=(volume of CO)/(C input of supplied 1-methylnaphthalene)×100 (Equation 6)

$CO_2$ selectivity (%)=(volume of $CO_2$)/(C input of supplied 1-methylnaphthalene)×100 (Equation 7)

carbon deposition ratio (%)=(weight of deposited carbon)/(C input of supplied 1-methylnaphthalene)×100 (Equation 8)

In addition, a ratio of an outlet hydrogen gas volume to an inlet hydrogen gas volume (hydrogen amplification ratio) was also recorded.

TABLE 1

| | No. | | | | |
|---|---|---|---|---|---|
| | 1 | 2 | 3 | 4 | 5 |
| Reaction Temperature (° C.) | 600 | 700 | 800 | 900 | 1000 |
| $H_2S$ concentration (ppm) | 2000 | 2000 | 2000 | 2000 | 2000 |
| Methane selectivity (%) | 3.1 | 1.9 | 2.7 | 0.9 | 2.8 |
| CO selectivity (%) | 3.6 | 8.0 | 37.1 | 67.8 | 55.5 |
| $CO_2$ selectivity (%) | 9.3 | 20.5 | 34.8 | 25.2 | 36.3 |
| carbon deposition ratio (%) | 9.3 | 2.4 | 3.6 | 1.8 | 1.4 |
| Hydrogen amplification ratio (—) | 1.5 | 1.5 | 2.2 | 2.4 | 2.8 |
| Decomposition ratio (%) | 25.3 | 32.9 | 78.2 | 95.7 | 96.0 |

As a result, for Nos. 1 to 5 of Table 1, even under an atmosphere containing $H_2S$ in a high concentration of 2,000 ppm, decomposition rates (methane selectivity+CO selectivity+$CO_2$ selectivity+carbon deposition ratio) increased, as reaction temperature increased. In addition, it could be seen that the carbon deposition rates were considerably suppressed even at all reaction temperatures. As such, it could be seen that a decomposition reaction of simulated tar, 1-methylnaphthalene, was performed even under harsh conditions with a high possibility of sulfur poisoning and high carbon deposition property. In addition, it was thought that hydrogen bonded to carbon constituting 1-methylnaphthalene was converted into a hydrogen molecule by reforming the catalyst from a viewpoint that as the decomposition ratio of simulated tar increased, the hydrogen amplification ratio increased.

Example 2

In the same manner as in Example 1, nickel, magnesium, and cerium were coprecipitated as hydroxides using nickel nitrate, cerium nitrate and magnesium nitrate as materials. Then, 50% by mass of alumina sol as alumina was added to this precipitate. Furthermore, the resulting material was sufficiently mixed with a mixer provided with a stirring blade, transferred to a recovery flask, mounted on a rotary evaporator, and suctioned with stirring to evaporate moisture. A compound of nickel, magnesium, cerium and aluminum adhered to the wall of the recovery flask was transferred to an evaporating dish, dried at 120° C., ground with a mortar, and a powder was press-molded into a tablet form with a diameter of 3 mm using an extrusion molding machine to obtain a tablet molded material. The molded material was baked in the air at 950° C., to prepare a catalyst molded material in which $Ni_{0.1}Ce_{0.1}Mg_{0.8}O$ was mixed with 50% by mass of aluminum converted to alumina. The component of molded material was confirmed by ICP analysis. As a result, the component was confirmed to be the desired component. In addition, the prepared product was measured by XRD. As a result, it was demonstrated that the product was composed of NiMgO, $MgAl_2O_4$, and $CeO_2$ phases. A single phase of alumina was not present in the catalyst thus obtained. The respective crystallite sizes were 18 nm, 12 nm and 21 nm.

A reforming reaction of simulated tar was performed under the same reduction and reaction conditions using a stationary reactor using this catalyst in the same manner as in Example 1.

TABLE 2

| | No. | | |
|---|---|---|---|
| | 6 | 7 | 8 |
| Reaction Temperature (° C.) | 700 | 800 | 900 |
| $H_2S$ concentration (ppm) | 2000 | 2000 | 2000 |
| Methane selectivity (%) | 1.8 | 2.5 | 0.8 |
| CO selectivity (%) | 8.5 | 37.5 | 67.9 |
| $CO_2$ selectivity (%) | 20.5 | 35.6 | 25.5 |
| carbon deposition ratio (%) | 2.2 | 3.0 | 1.7 |
| Hydrogen amplification ratio (—) | 1.5 | 2.2 | 2.4 |
| Decomposition ratio (%) | 33.0 | 78.6 | 95.9 |

As a result, for Nos. 6 to 8 of Table 2, similarly to Example 1, even under an atmosphere containing $H_2S$ in a high concentration of 2,000 ppm, decomposition rates (methane selectivity+CO selectivity+$CO_2$ selectivity+carbon deposition ratio) increased, as reaction temperature increased. In addition, it could be seen that the carbon deposition rates were considerably suppressed even at all reaction temperatures. As such, it could be seen that the decomposition reaction of simulated tar, 1-methylnaphthalene, was performed even under harsh conditions in which the possibility of sulfur poisoning is high and carbon deposition property is high.

Example 3

Nickel, cerium, magnesium and aluminum were coprecipitated as hydroxides in the same manner as in Example 1, except a mixed solution containing aluminum nitrate in addition to nickel nitrate, cerium nitrate and magnesium nitrate as materials was used. Then, the coprecipitate was aged while maintained at 60° C. with continuous stirring for a predetermined period of time, filtered by suction and sufficiently washed with pure water of 80° C. In Example 3, an alumina sol was not added to the precipitate. The resulting precipitate was transferred to an evaporating dish, dried at 120° C. and ground with a mortar, and the resulting powder was press-molded in the same manner as in Example 1 to obtain a tablet molded material. The molded material was baked in the air at 950° C., to prepare a catalyst molded material. The component of molded material was confirmed by ICP analysis. As a result, the component was confirmed to be the desired component. In addition, the prepared product was measured by XRD. As a result, it was demonstrated that the product was composed of NiMgO, $MgAl_2O_4$, and $CeO_2$ phases. A single phase of alumina was not present in the catalyst thus obtained. The respective crystallite sizes were 14 nm, 14 nm and 22 nm.

A reforming reaction of simulated tar was performed under the same reduction and reaction conditions using a stationary reactor using this catalyst in the same manner as in Example 1.

TABLE 3

|  | No. | | |
| --- | --- | --- | --- |
|  | 9 | 10 | 11 |
| Reaction Temperature (° C.) | 700 | 800 | 900 |
| $H_2S$ concentration (ppm) | 2000 | 2000 | 2000 |
| Methane selectivity (%) | 1.8 | 2.8 | 0.8 |
| CO selectivity (%) | 7.6 | 36.0 | 67.7 |
| $CO_2$ selectivity (%) | 19.2 | 33.4 | 24.7 |
| carbon deposition ratio (%) | 4.2 | 5.8 | 2.1 |
| Hydrogen amplification ratio (—) | 1.5 | 2.2 | 2.4 |
| Decomposition ratio (%) | 32.8 | 78.0 | 95.3 |

As a result, for Nos. 9 to 11 of Table 3, even under an atmosphere containing $H_2S$ in a high concentration of 2,000 ppm, decomposition rates (methane selectivity+CO selectivity+$CO_2$ selectivity+carbon deposition ratio) increased, as reaction temperature increased, similarly to Example 1. In addition, it could be seen that the carbon deposition rates were considerably suppressed even at all reaction temperatures. As such, it could be seen that the decomposition reaction of simulated tar, 1-methylnaphthalene, was performed even under harsh conditions in which the possibility of sulfur poisoning was high and carbon deposition property was high. The carbon deposition ratio of Example 3 was slightly higher, as compared to Example 1 or 2.

Example 4

Nickel, cerium and magnesium were coprecipitated as hydroxides in the same manner as in Example 1. Then, the coprecipitate was aged while maintained at 60° C. with continuous stirring for a predetermined period of time. Then, the coprecipitate was filtered by suction and sufficiently washed with pure water at 80° C. The resulting precipitate was dried at 120° C. and ground with a mortar, the coprecipitate was baked (burned) in the air at 600° C., ground, injected into a beaker and an alumina sol was added thereto. Then, the resulting material was sufficiently mixed using a mixer provided with a stirring blade, transferred to a recovery flask, mounted on a rotary evaporator, and suctioned with stirring to evaporate moisture. A compound of nickel, magnesium, cerium and aluminum adhered to the wall of a recovery flask was transferred to an evaporating dish, dried at 120° C., ground with a mortar, and burned in the air at 950° C. The resulting powder was press-molded in the same manner as Example 1 using an extrusion molding machine with a diameter of 20 mm to obtain a tablet molded material. Then, the molded material was ground with a mortar and granulated to a size of 1.0 to 2.8 mm using a sieve. The component of the granulate product was confirmed by ICP analysis. As a result, the component was confirmed to be the desired component. In addition, the prepared product was measured by XRD. As a result, it was demonstrated that the product was composed of NiMgO, $MgAl_2O_4$, and $CeO_2$ phases. A single phase of alumina was not present in the catalyst thus obtained. The respective crystallite sizes were 28 nm, 15 nm and 27 nm.

A reforming reaction of simulated tar was performed under the same reduction conditions and reaction conditions of No. 3 using a stationary reactor using this catalyst in the same manner as in Example 1. As a result, the methane selectivity was 2.5%, the CO selectivity was 36.6%, the $CO_2$ selectivity was 34.3%, the carbon deposition ratio was 4.3%, the decomposition ratio was 77.7%, and the hydrogen amplification ratio was 2.2 times. As such, it can be seen that the catalyst obtained by the preparation method undergoes decomposition reaction of simulated tar, 1-methylnaphthalene even under harsh conditions in which the possibility of sulfur poisoning is high and a carbon deposition property is high.

Example 5

A catalyst molded material was prepared in the same manner as in Example 1 except that the percentage (%) by mass of nickel, cerium and magnesium were the same as shown in Table 4. In addition, the % by mass of alumina shown in Table 4 was the % by mass when aluminum was used as alumina (a single phase of alumina was not present in the catalyst obtained in Example 5).

A reforming reaction of simulated tar was performed under the same reduction conditions and under the reaction conditions of No. 2 using a stationary reactor using this catalyst in the same manner as in Example 1.

TABLE 4

|  | No. | | | | | | | | | |
| --- | --- | --- | --- | --- | --- | --- | --- | --- | --- | --- |
|  | 12 | 13 | 14 | 15 | 16 | 17 | 18 | 19 | 20 | 21 |
| Ni (% by mass) | 0.4 | 1 | 8 | 6 | 10 | 14 | 9 | 18 | 34 | 55 |
| Mg (% by mass) | 9 | 8 | 3 | 17 | 15 | 12 | 33 | 11 | 11 | 1 |
| Ce (% by mass) | 3 | 5 | 4 | 13 | 12 | 12 | 11 | 35 | 16 | 7 |
| Alumina (% by mass) | 80 | 80 | 80 | 50 | 50 | 50 | 20 | 20 | 20 | 20 |
| Methane selectivity (%) | 1.0 | 1.5 | 3.4 | 2.7 | 2.4 | 2.2 | 3.5 | 4.2 | 4.0 | 3.9 |
| CO selectivity (%) | 8.5 | 19.8 | 34.0 | 37.1 | 39.9 | 39.2 | 38.1 | 41.8 | 45.5 | 31.3 |
| $CO_2$ selectivity (%) | 10.8 | 18.3 | 30.3 | 34.8 | 35.1 | 34.4 | 33.9 | 30.1 | 29.1 | 23.4 |
| carbon deposition ratio (%) | 9.8 | 10.4 | 10.8 | 3.6 | 3.8 | 5.7 | 3.9 | 4.0 | 15.7 | 28.2 |
| Hydrogen amplification ratio (–) | 1.4 | 1.8 | 2.2 | 2.2 | 2.2 | 2.2 | 2.2 | 2.5 | 2.7 | 2.6 |
| Decomposition ratio (%) | 30.1 | 50.0 | 78.5 | 78.2 | 81.2 | 81.5 | 79.4 | 80.1 | 94.3 | 86.8 |

As a result, as shown in Table 4, as the weight of Ni as the main active component decreased, the decomposition ratio of methyl naphthalene decreased, hydrogen amplification ratio decreased, and No. 12, in which the weight of Ni was lower than 1% by mass, exhibited a low decomposition ratio and low hydrogen amplification ratio. Meanwhile, as the weight of Ni increased, the decomposition ratio and hydrogen amplification ratio increased. However, No. 21, in which the weight of Ni was higher than 50% by mass, exhibited a high level of carbon deposition. In addition, comparing No. 16 with No. 18, the case containing a greater amount of alumina component exhibited superior catalytic activity due to the difference in the weight of alumina in spite of the substantially equivalent weight of Ni. The reason was thought to be that the alumina component finely fragmented the nickel magnesia compound phase, the size of Ni metal particles precipitated during reduction decreased and the reaction surface area thus increased. In addition, as the weight of Mg increased, the carbon deposition ratio decreased. In addition, the case containing a greater amount of Ce component exhibited superior catalytic activity due to the difference in the weight of Ce in spite of the substantially equivalent weight of Ni.

Example 6

A catalyst molded material was prepared in the same manner as in Example 1, except that a baking temperature was 500° C. The component of the molded material was confirmed by ICP analysis. As a result, the component was confirmed to be the desired component. In addition, the prepared product was measured by XRD. As a result, the product exhibited a substantially broad diffraction curve and minimal peaks of NiMgO, $MgAl_2O_4$ and $CeO_2$ phases were observed as an amorphous structure (a single phase of alumina was not present in the catalyst thus obtained). The respective crystallite sizes obtained from the small and broad peaks were 0.9 nm, 0.6 nm and 0.5 nm. The activity of catalyst molded material was evaluated in the same conditions as No. 3 of Example 1. As a result, the catalyst molded material had a 1-methylnaphthalene decomposition ratio of about 43% on average for 8 hours and a hydrogen amplification ratio of about 1.7, which indicated that the catalyst molded material had medium catalytic activity.

Example 7

A catalyst molded material was prepared in the same manner as in Example 1, except that a baking temperature was 1,500° C. The component of molded material was confirmed by ICP analysis. As a result, the component was confirmed to be the desired component. In addition, the prepared product was measured by XRD. As a result, it could be confirmed that the product exhibited a considerably sharp diffraction curve and was composed of NiMgO, $MgAl_2O_4$ and $CeO_2$ phases (a single phase of alumina was not present in the catalyst thus obtained). The respective crystallite sizes obtained from the considerably sharp peaks were 76 nm, 67 nm and 82 nm. The reason was thought to be that granular growth of respective crystallites was easy due to the considerably high baking temperature. The activity of catalyst molded material was evaluated in the same conditions as No. 3 of Example 1. As a result, the catalyst molded material had a 1-methylnaphthalene decomposition ratio of about 66% on average for 8 hours, a carbon deposition ratio of 9% and a hydrogen amplification ratio of about 1.8. Accordingly, this catalyst exhibited a relatively high conversion ratio of 1-methylnaphthalene gas and a relatively high carbon deposition ratio.

Example 8

A baked catalyst powder in which $Ni_{0.1}Ce_{0.1}Mg_{0.8}O$ was mixed with 50% by mass of aluminum as alumina was obtained in the same manner as Example 1 (a single phase of alumina was not present in the catalyst thus obtained), the powder was press-molded into a tablet form with a diameter of 20 mm using an extrusion molding machine to obtain a tablet molded material. This molded material was ground with a mortar and granulated to a size of 1.0 to 2.8 mm using a sieve.

A reforming reaction of simulated tar was performed under the reaction conditions of No. 3 using a stationary reactor without performing any reduction reaction using this catalyst in the same manner as in Example 1. As a result, the methane selectivity was 3.1%, the CO selectivity was 35.8%, the $CO_2$ selectivity was 32.7%, the carbon deposition ratio was 5.6%, the decomposition ratio was 77.2% and the hydrogen amplification ratio was 2.2 times. As such, it could be seen that the catalyst prepared by the method allowed the decomposition reaction of simulated tar, 1-methylnaphthalene, without any preliminary reduction treatment, even under harsh conditions in which the possibility of sulfur poisoning was high and carbon deposition property was high.

Example 9

A reaction was continuously performed for 8 hours under the same conditions as in No. 3 of Example 1, supply of raw materials was ceased, $N_2$ as a carrier gas (at 60 mL/min) and $H_2O$ (at 60 mL/min in terms of gas) were fed at a catalyst layer temperature of 800° C. for 5 hours to remove carbon or sulfur deposited on the catalyst, and supply of raw materials was newly initiated in the same conditions as in Example 2. As a result, an activity of 90% or more as compared to before regeneration was confirmed. In addition, it was confirmed through this test that the concentration of hydrogen in the gas after reforming was high and hydrogen, carbon monoxide and methane were converted as gases of the main components.

Example 10

In the same manner as in Example 9, a reaction was continuously performed for 8 hours under the conditions of No. 3 of Example 1, supply of raw materials was ceased, $N_2$ as a carrier gas (at 60 mL/min) and air (at 60 mL/min) were fed at a catalyst layer temperature of 800° C. for 2 hours to remove carbon or sulfur deposited on the catalyst, and supply of raw materials was newly initiated in the same conditions as in Example 1. As a result, an activity of 90% or more as compared to before regeneration was confirmed. In addition, it was confirmed through this test that the concentration of hydrogen in the gas after reforming was high and hydrogen, carbon monoxide and methane were converted as gases of the main components.

Example 11

80 kg of a coal charge used for an actual coke oven was charged in a batch furnace to simulate a coke oven, and the temperature was elevated to 800° C. to conform with the actual coke oven to generate an actual coke oven gas and an accompanying actual tar. The tar in the tar-containing gas was present at about 0.04 g/L. The gas was collected by a suction pump and then used in the test. A compound of the nickel, magnesium, cerium and alumina obtained by the same preparation method as in Example 1 was burned at 600° C. and a powder was molded in the form of a ring using a ring tableting machine and baked in the air at 950° C. to prepare a molded catalyst material having the shape of a ring with an outer diameter of about 15 mm, an inner diameter of about 5 mm and a height of about 15 mm. The component of molded material was confirmed by ICP analysis. As a result, the component was confirmed to be the desired component. In addition, the prepared product was measured by XRD. As a result, it was demonstrated that the product was composed of NiMgO, $MgAl_2O_4$, and $CeO_2$ phases. A single phase of alumina was not present in the catalyst thus obtained. The respective crystallite sizes were 29 nm, 16 nm and 29 nm. In addition, the strength of the molded material was measured using a Kiya hardness tester. As a result, the catalyst maintained a high strength of about 120 N. A reaction tube was arranged in an electric furnace designed such that the reaction temperature was 800° C., a molded catalyst was set on the center thereof, hydrogen was reduced at 10 NL/min for 2 hours and a gas collected from a batch furnace was fed into the catalyst layer. At this time, the catalyst decomposition activity of actual coke oven gas and accompanying actual tar was continuously evaluated for 5 hours. An inlet gas flow rate was 10 NL/min and a catalyst charge amount was about 1 L. In addition, it was confirmed by gas chromatography that the composition of inlet gas was the substantially the same as actual coke oven gas. In addition, it was confirmed that the gas contained 2,400 to 2,500 ppm of hydrogen sulfide. The concentration of tar in the gas was evaluated in accordance with the following method. That is, a preliminarily evacuated 1 L vacuum collection bottle was mounted on a cock of inlet and outlet parts of the catalyst layer and respective gases were then collected. Furthermore, the bottle was washed with dichloromethane, the dichloromethane was completely removed at room temperature and a liquid component was weighed. Furthermore, the tar decomposition ratio was obtained from a ratio of a weight of tar in the catalyst layer outlet gas to a weight of tar component in the catalyst layer inlet gas collected by the method. As a result, the tar decomposition ratio was about 90.5% for 2 hours after initiation of the reaction and the hydrogen amplification ratio reached 2.4 on average for 5 hours. It was confirmed that substantially the same coal carbonization tar-containing gas as discharged from the coke oven underwent a catalyst dry gasification reaction.

Example 12

Figure 2:
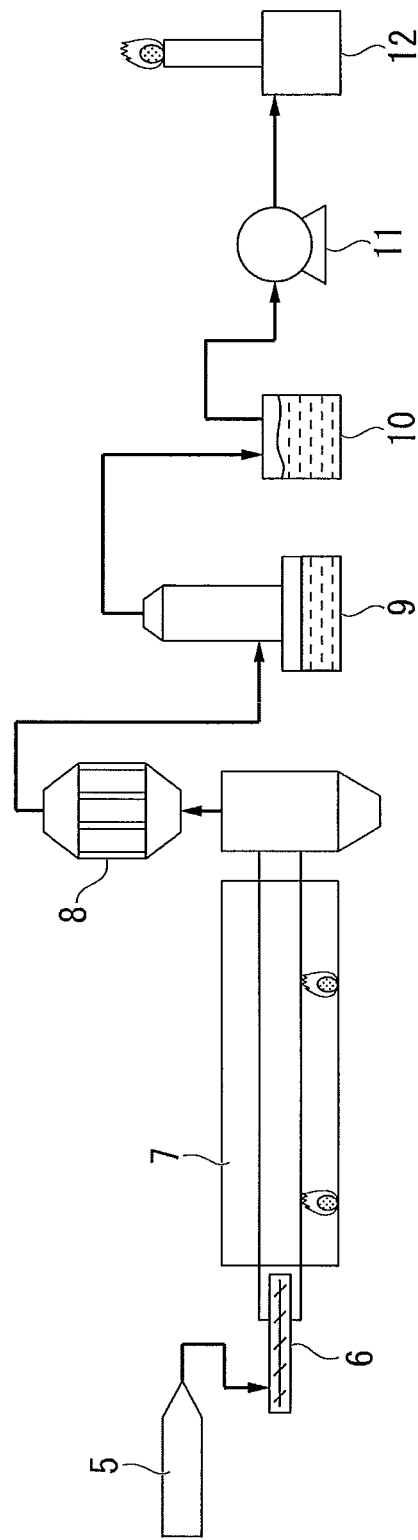
FIG. 2 is a view illustrating a coal carbonization process in Example and a process for reforming a tar-containing gas generated therefrom using a catalyst.

A rotary kiln 7 shown in FIG. 2 as a carbonization furnace was heated to a temperature of 800° C. and a lump of coal was fed at a feed speed of 20 kg/h in the rotary kiln 7 using a constant volumetric feeder 6 from a hopper 5 containing the lump of coal (size-screened to 5 cm or less). As a result, a carbonized gas containing tar was generated. A gas flow rate was adjusted to about of 10 $Nm^3$/h through an induced draft fan 11 and the tar-containing gas (carbonized gas) was injected into a catalyst reactor 8 which contained the same ring-shaped molded catalyst as in Example 11 and was warmed at about 800° C. to bring the gas in contact with the catalyst. At this time, the catalyst decomposition activity of tar-containing gas was continuously evaluated for 8 hours. Then, the reformed gas was cooled with water with a scrubber 9, dust removal was performed with an oil bubbler 10 and combustion diffusion was performed with a flare stack 12. In addition, before supply of raw materials, reduction treatment was performed with hydrogen of 5 $Nm^3$/h for 30 minutes. An inlet gas flow rate was about 10 $Nm^3$/h and a catalyst charge amount was about 15 L. The tar in the tar-containing gas was about 60 g/$Nm^3$. In addition, it was confirmed by gas chromatography that an inlet gas composition had substantially the same composition as the actual coke oven gas. In addition, about 6% of moisture present in coal, as a material, in the gas was volatilized and water vapor was contained therein. In addition, it was confirmed that the gas contained hydrogen sulfide at 2,000 to 2,500 ppm. The concentration of tar in the gas was evaluated by absorbing a gas from an inlet and an outlet of the catalyst layer for a predetermined period, collecting the tar component in the gas using a 5-stage impinger containing dichloromethane, removing the dichloromethane and weighing the resulting liquid component at room temperature. Furthermore, the tar decomposition ratio was obtained from a ratio of a weight of tar in the catalyst layer outlet gas to a weight of tar component in the catalyst layer inlet gas collected by the method. As a result, the tar decomposition ratio was about 84% for 3 hours after initiation of the reaction and hydrogen amplification ratio reached 2.4 on average for 8 hours. Accordingly, it was confirmed that a catalyst dry gasification reaction of the tar-containing gas was performed on a bench plant scale.

Example 13

Using the same equipment as in Example 12, 10 kg/h of construction waste chips (size-screened to 5 cm or less) were subjected to carbonization with a rotary kiln 7 maintained at 800° C. to generate a biomass tar-containing gas (carbonized gas). The tar-containing gas was injected into a catalyst reactor which contained the same molded catalyst as in Example 9 and was warmed at about 800° C. to bring the gas in contact with the catalyst. At this time, the catalyst decomposition activity of the tar-containing gas was continuously evaluated for 8 hours. In addition, before supply of raw materials, reduction treatment was performed with hydrogen of 5 $Nm^3$/h for 30 minutes. An inlet gas flow rate was about 10 $Nm^3$/h and a catalyst charge amount was about 15 L. The tar in the biomass tar-containing gas was about 10 g/$Nm^3$. In addition, it was confirmed by gas chromatography that an inlet gas composition had substantially the same composition as the actual coke oven gas and contained hydrogen, CO, methane and $CO_2$ as main components. In addition, about 16% of moisture present in the construction waste material, as a material, in the gas was volatilized and water vapor contained therein. In addition, it was confirmed that the gas contained 25 ppm of hydrogen sulfide. The tar decomposition ratio was evaluated by collecting the tar component in the gas from an inlet and an outlet of the catalyst layer in the same manner as in Example 12 and weighing the tar component. As a result, the tar decomposition ratio was about 95% 3 hours after initiation of the reaction and the hydrogen amplification ratio reached about 6.8 on average for 8 hours. Accordingly, it was confirmed that the catalyst dry gasification reaction of the tar-containing gas was performed on a bench plant scale.

Example 14

After reforming for 8 hours in the same manner as in Example 12, supply of the coal material was ceased, the inside of the system was purged with nitrogen, air was adsorbed from a gas incorporation hole mounted near an inlet of the rotary kiln 7 maintained at 800° C., the air heated at the rotary kiln was incorporated into the catalyst reactor for about 10 hours, and carbon deposited on the surface of catalyst and sulfur adsorbed thereon after reforming were removed and regenerated. Then, the inside of system was purged with nitrogen to extract the oxygen component, reduction treatment was performed with hydrogen at 5 $Nm^3$/h for 30 minutes, raw materials were fed at the same rate as in Example 12, and were brought in contact with the catalyst. At this time, the catalyst decomposition activity of tar-containing gas was continuously evaluated for 8 hours. As a result, it was confirmed that tar the decomposition ratio and hydrogen amplification ratio after reforming were substantially the same as those before regeneration and regeneration of the catalyst by air combustion was sufficient. In addition, catalyst decomposition of the tar-containing gas and regeneration of the catalyst were substantially repeated 5 times, but the hydrogen amplification ratio was stable, like before regeneration, which indicated that operation for a long period of time was possible.

Example 15

After reforming for 8 hours in the same manner as in Example 13, supply of the construction waste chips was ceased, the inside of the system was purged with nitrogen in the same manner as Example 14, air was adsorbed from a gas incorporation hole mounted near an inlet of the rotary kiln 7 maintained at 800° C., the air heated at the rotary kiln was incorporated to the catalyst reactor for about 10 hours, and carbon deposited on the surface of catalyst and sulfur adsorbed thereon after reforming were removed and regenerated. Then, the inside of system was purged with nitrogen to extract the oxygen component, reduction treatment was performed with hydrogen at 5 Nm$^3$/h for 30 minutes, raw materials were fed at the same rate as in Example 13, and were brought in contact with the catalyst. At this time, the catalyst decomposition activity of tar-containing gas was continuously evaluated for 8 hours. As a result, it was confirmed that the tar decomposition ratio and hydrogen amplification ratio after reforming were substantially the same as those before regeneration and regeneration of catalyst by air combustion was sufficient. In addition, the catalyst decomposition of the biomass tar-containing gas and regeneration of catalyst were substantially repeated 7 times, but the hydrogen amplification ratio was stable, like before regeneration, which indicated operation possibility for a long period of time.

Comparative Example 1

A reforming test was performed using a naphtha primary reforming catalyst (SC11NK manufactured by Süd-Chemie Catalysts Japan, Inc.; Ni-20% by mass, supported alumina, high strength of 500 N), an industrial catalyst prepared in accordance with an impregnation support method, as a catalyst, under conditions of No. 3 in the same manner as in Example 1. On average for 8 hours, the methane selectivity was 2.5%, the CO selectivity was 4.2%, the $CO_2$ selectivity was 5.9%, the carbon deposition ratio was 32.8%, the decomposition ratio was 45.4%, and the hydrogen amplification ratio was about 1.3.

Accordingly, the industrial catalyst had a low conversion ratio of 1-methylnaphthalene (12.6%) into gas components and a considerably high carbon deposition ratio. The lifespan of the catalyst may be readily shortened due to the considerably high carbon deposition ratio and oxidation treatment at a high temperature or for a long period of time is required in spite of regeneration treatment after reaction. For this reason, it is considered that catalytic activity particles cause sintering due to the large combustion heat and performance after regeneration is further decreased.

Comparative Example 2

The industrial catalyst (SC11NK) used for Comparative Example 1 was charged in a catalyst reactor using the same test equipment as Example 12 and a test was performed. As a result, the tar decomposition ratio was about 22% and the hydrogen amplification ratio reached about 1.5 on average for 8 hours. It was confirmed from the test under the actual coke oven gas and actual tar that the industrial catalyst had a low tar decomposition ratio.

Comparative Example 3

A precipitate of nickel and magnesium was prepared in the same manner as in Example 1, filtered, washed, dried and baked in the air at 950° C. for 20 hours to obtain a compound of nickel and magnesia. Then, a silica sol was added such that $SiO_2$ in the catalyst was present at 50% by mass to prepare a slurry. Then, the slurry was spray dried such that the average diameter was about 50 µm, and the resulting powder was baked in the air at 950° C. In addition, the resulting solid solution oxide was molded and baked in the same manner as in Example 1, and subjected to activity evaluation under the same conditions as No. 3 of Example 1. As a result, it was confirmed that the catalytic activity was low in that the decomposition ratio of 1-methylnaphthalene on average for 8 hours was considerably low at about 15% and a hydrogen amplification ratio of about 1.0 was not increased.

Comparative Example 4

Hydroxides of nickel and magnesium were coprecipitated, filtered, washed, dried and coarsely ground in the same manner as in Example 1, except that nickel nitrate and magnesium nitrate were used as raw materials. Then, the coprecipitate was baked (burned) in the air at 600° C., ground, injected to a beaker and an alumina sol was added thereto. Then, the resulting material was sufficiently mixed using a mixer provided with a stirring blade, transferred to a recovery flask, mounted in a rotary evaporator, and suctioned with stirring to evaporate moisture. A compound of nickel, magnesium, cerium and aluminum adhered to the wall of a recovery flask was transferred to an evaporating dish, dried at 120° C., burned at 600° C., and a powder was press-molded into a tablet form with a diameter of 3 mm using an extrusion molding machine to obtain a tablet molded material. The molded material was baked in the air at 950° C., to prepare a catalyst molded material in which $Ni_{0.1}Mg_{0.9}O$ was mixed with 50% by mass of aluminum. In addition, the molded material was measured by a Kiya hardness tester. As a result, it could be seen that the material had a low strength of about 50 N.

The mixture was molded and baked in the same manner of Example 1 and was subjected to activity evaluation in the same conditions as No. 3 of Example 1. As a result, the catalyst molded material had a 1-methylnaphthalene decomposition ratio of about 62.6% on average for 8 hours (carbon deposition ratio of 13.9%) and a hydrogen amplification ratio of about 1.7, which indicated that the catalyst molded material had medium catalytic activity and a considerably high carbon deposition ratio.

Comparative Example 5

An aqueous mixed solution of nickel nitrate, cerium ammonium nitrate and magnesium nitrate was supported on alumina pre-baked at 1,200° C. for 3 hours (surface area: 143 m$^2$/g) by an incipient wetness method, such that nickel, cerium oxide and magnesium oxide were adjusted to 12% by mass, 15% by mass and 2% by mass, respectively, dried at 110° C. for 12 hours and baked at 500° C. for 3 hours to prepare a catalyst molded material. In addition, the component of the molded material was confirmed by ICP analysis. As a result, the component was confirmed to be the desired component. In addition, the prepared product was measured by XRD. As a result, it was confirmed that, in addition to NiMgO, MgAl$_2$O$_4$ and CeO$_2$ phases, an Al$_2$O$_3$ phase was present. The respective crystallite sizes of respective phases other than Al$_2$O$_3$ were 20 nm, 68 nm and 14 nm. The reason for increased crystallite size of MgAl$_2$O$_4$ phase was thought to be that a large amount of Al$_2$O$_3$ phase was present and granular growth of MgAl$_2$O$_4$ phase was thus facilitated. The catalyst molded material thus prepared was subjected to activity evaluation under the same conditions of No. 1 of Example 1. As a result, the catalyst molded material had a 1-methylnaphthalene decomposition ratio of about 20.5% on average for 8 hours (carbon deposition ratio of 10.2%), a low hydrogen amplification ratio of about 1.4 and a relatively high carbon deposition level.

INDUSTRIAL APPLICABILITY

According to the present invention, a tar-containing gas generated when coal or biomass is thermally decomposed can be stably converted into light chemical substances such as carbon monoxide or hydrogen. For this reason, the present invention has considerable industrial applicability.

REFERENCE SIGNS LIST 1 ascending pipe
2 ammonia solution
3 coke oven
4 dry main
5 raw material hopper
6 constant volumetric feeder
7 outer heating rotary kiln
8 catalyst reactor
9 water scrubber
10 oil bubbler
11 draft fan
12 flare stack

The invention claimed is:
1. A catalyst for reforming a tar-containing gas, wherein:
the catalyst comprises at least one composite oxide as oxide containing nickel, magnesium, cerium and aluminum;
a content of alumina as a single compound in the catalyst is limited to 5% by mass or less; and
a content of magnesium in the catalyst is 3 to 45% by mass.
2. The catalyst according to claim 1, wherein a crystal structure of the composite oxide includes a NiMgO crystal phase, MgAl$_2$O$_4$ crystal phase, and CeO$_2$ crystal phase.
3. The catalyst according to claim 2, wherein, of the respective crystal phases, a size of crystallites of the (200) plane of the NiMgO crystal phase is 1 nm to 50 nm, a size of crystallites of the (311) plane of the MgAl$_2$O$_4$ crystal phase is 1 nm to 50 nm, and a size of crystallites of the (111) plane of the CeO$_2$ crystal phase is 1 nm to 50 nm, in which the size of crystallites is obtained by X-ray diffraction measurement.
4. The catalyst according to claim 1, wherein:
a content of nickel in the catalyst is 1 to 50% by mass, a content of cerium is 1 to 40% by mass, and a content of aluminum converted to alumina is 20 to 80% by mass.
5. A method for preparing a catalyst for reforming a tar-containing gas according to claim 1, the catalyst comprising at least one composite oxide containing nickel, cerium, magnesium and aluminum and wherein the catalyst further comprises alumina as a single compound limited to 5% by mass or less and a content of magnesium of from 3% to 45% by mass with the method comprising:
coprecipitating a precipitate from a mixed solution containing a nickel compound, a magnesium compound and a cerium compound;
burning the precipitate;
adding an alumina powder and water, or an alumina sol to the burned precipitate to produce a mixture; and
baking the mixture.
6. The method according to claim 5, wherein the baking includes drying and grinding the mixture, or drying, burning, grinding and molding the mixture, before baking the mixture.
7. A method for preparing a catalyst for reforming a tar-containing gas according to claim 1, the catalyst comprising at least one composite oxide containing nickel, cerium, magnesium and aluminum and wherein the catalyst further comprises alumina as a single compound limited to 5% by mass or less and a content of magnesium of from 3% to 45% by mass with the method comprising:
coprecipitating a precipitate from a mixed solution containing a nickel compound, a magnesium compound and a cerium compound;
adding an alumina powder and water, or an alumina sol to the precipitate to produce a mixture; and
baking the mixture.
8. The method according to claim 7, wherein the baking includes drying and grinding the mixture, or drying, burning, grinding and molding the mixture, before baking the mixture.
9. A method for preparing a catalyst for reforming a tar-containing gas according to claim 1, the catalyst comprising at least one composite oxide containing nickel, cerium, magnesium and aluminum and wherein the catalyst further comprises alumina as a single compound limited to 5% by mass or less and a content of magnesium of from 3% to 45% by mass with the method comprising:
coprecipitating a precipitate from a mixed solution containing a nickel compound, a magnesium compound and a cerium compound;
adding an alumina powder and water, or an alumina sol to the precipitate to produce an intermediate mixture;
burning the intermediate mixture;
adding an alumina powder and water, or an alumina sol to the intermediate mixture to produce a mixture; and
baking the mixture.
10. The method according to claim 9, wherein the baking includes drying and grinding the mixture, or drying, burning, grinding and molding the mixture, before baking the mixture.
11. A method for preparing a catalyst for reforming a tar-containing gas according to claim 1, the catalyst comprising at least one composite oxide containing nickel, cerium, magnesium and aluminum and wherein the catalyst further comprises alumina as a single compound limited to 5% by mass or less and a content of magnesium of from 3% to 45% by mass with the method comprising:
coprecipitating a mixture from a mixed solution containing a nickel compound, a magnesium compound, a cerium compound and an aluminum compound; and
baking the mixture.
12. The method according to claim 11, wherein the baking includes drying and grinding the mixture, or drying, burning, grinding and molding the mixture, before baking the mixture.
13. A method for reforming a tar-containing gas using the catalyst for reforming a tar-containing gas prepared by the method according to claim 5, comprising:
bringing hydrogen, carbon dioxide and water vapor in a tar-containing gas generated when a carbonaceous material is thermally decomposed, in contact with the catalyst for reforming a tar-containing gas.

14. The method according to claim 13, wherein the method comprises:
- collecting by condensation of tar in the tar-containing gas generated when a carbonaceous material is thermally decomposed;
- gasifying the tar by heating; and
- bringing at least one of hydrogen, carbon dioxide and water vapor incorporated from the outside in contact with the catalyst for reforming a tar-containing gas.

15. The method according to claim 13, wherein, in the being brought contact with the catalyst for reforming a tar-containing gas, an oxygen-containing gas incorporated from the outside is further brought in contact with the catalyst.

16. The method according to claim 13, wherein the tar-containing gas contains 20 ppm to 4,000 ppm of hydrogen sulfide.

17. The method according to claim 13, wherein the tar-containing gas is a carbonized gas generated when coal is carbonized.

18. The method according to claim 13, wherein the tar-containing gas is a coke oven gas discharged from a coke oven.

19. The method according to claim 13, wherein the tar-containing gas is a carbonized gas generated when biomass is carbonized.

20. The method according to claim 13, wherein the catalyst for reforming a tar-containing gas is brought in contact with the tar-containing gas under an atmosphere at 600 to 1,000° C.

21. A method for regenerating a catalyst for reforming a tar-containing gas by bringing the catalyst in contact with one of water vapor and air, in a case where performance of the catalyst is deteriorated by at least one of carbon deposition and sulfur poisoning when performing the method for reforming the tar-containing gas according to claim 13.

22. A method for reforming a tar-containing gas using the catalyst for reforming a tar-containing gas prepared by the method according to claim 6, comprising:
- bringing hydrogen, carbon dioxide and water vapor in a tar-containing gas generated when a carbonaceous material is thermally decomposed, in contact with the catalyst for reforming a tar-containing gas.

23. A method for reforming a tar-containing gas using the catalyst for reforming a tar-containing gas prepared by the method according to claim 7, comprising:
- bringing hydrogen, carbon dioxide and water vapor in a tar-containing gas generated when a carbonaceous material is thermally decomposed, in contact with the catalyst for reforming a tar-containing gas.

24. A method for reforming a tar-containing gas using the catalyst for reforming a tar-containing gas prepared by the method according to claim 8, comprising:
- bringing hydrogen, carbon dioxide and water vapor in a tar-containing gas generated when a carbonaceous material is thermally decomposed, in contact with the catalyst for reforming a tar-containing gas.

25. A method for reforming a tar-containing gas using the catalyst for reforming a tar-containing gas prepared by the method according to claim 9, comprising:
- bringing hydrogen, carbon dioxide and water vapor in a tar-containing gas generated when a carbonaceous material is thermally decomposed, in contact with the catalyst for reforming a tar-containing gas.

26. A method for reforming a tar-containing gas using the catalyst for reforming a tar-containing gas prepared by the method according to claim 10, comprising:
- bringing hydrogen, carbon dioxide and water vapor in a tar-containing gas generated when a carbonaceous material is thermally decomposed, in contact with the catalyst for reforming a tar-containing gas.

27. A method for reforming a tar-containing gas using the catalyst for reforming a tar-containing gas prepared by the method according to claim 11, comprising:
- bringing hydrogen, carbon dioxide and water vapor in a tar-containing gas generated when a carbonaceous material is thermally decomposed, in contact with the catalyst for reforming a tar-containing gas.

28. A method for reforming a tar-containing gas using the catalyst for reforming a tar-containing gas prepared by the method according to claim 12, comprising:
- bringing hydrogen, carbon dioxide and water vapor in a tar-containing gas generated when a carbonaceous material is thermally decomposed, in contact with the catalyst for reforming a tar-containing gas.

* * * * *